(12) United States Patent
Marzinzik

(10) Patent No.: US 12,400,643 B2
(45) Date of Patent: Aug. 26, 2025

(54) SYSTEMS AND METHODS FOR PARSING MULTIPLE INTENTS IN NATURAL LANGUAGE SPEECH

(71) Applicant: State Farm Mutual Automobile Insurance Company, Bloomington, IL (US)

(72) Inventor: Duane L. Marzinzik, Springfield, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/330,859

(22) Filed: Jun. 7, 2023

(65) Prior Publication Data

US 2023/0317068 A1 Oct. 5, 2023

Related U.S. Application Data

(63) Continuation of application No. 16/988,130, filed on Aug. 7, 2020, now Pat. No. 11,705,114.

(Continued)

(51) Int. Cl.
*G06F 40/30* (2020.01)
*G10L 15/18* (2013.01)
(Continued)

(52) U.S. Cl.
CPC ...... *G10L 15/1822* (2013.01); *G10L 15/1815* (2013.01); *G10L 15/22* (2013.01);
(Continued)

(58) Field of Classification Search
None
See application file for complete search history.

(56) References Cited

U.S. PATENT DOCUMENTS 6,631,346 B1 10/2003 Karaorman
7,242,751 B2 7/2007 Bushey
(Continued)

FOREIGN PATENT DOCUMENTS

EP 1043711 B1 10/2004
EP 3453160 A1 3/2019
(Continued)

OTHER PUBLICATIONS

"ParserAnnotator", Webpage, CoreNLP version 3.9.2, Stanford, archived on Jun. 1, 2019 at URL: https://web.archive.org/web/20190601035852/https://stanfordnlp.github.io/CoreNLP/parse.html.
(Continued)

*Primary Examiner* — Richard Z Zhu
(74) *Attorney, Agent, or Firm* — Armstrong Teasdale LLP

(57) ABSTRACT

A system for parsing separate intents in natural language speech configured to (i) receive, from the user computer device, a verbal statement of the user including a plurality of words; (ii) translate the verbal statement into text; (iii) label each of the plurality of words in the verbal statement; (iv) detect one or more potential splits in the verbal statement; (v) divide the verbal statement into a plurality of intents based upon the one or more potential splits; and (vi) generate a response based upon the plurality of intents.

20 Claims, 16 Drawing Sheets

Related U.S. Application Data

(60) Provisional application No. 62/972,478, filed on Feb. 10, 2020, provisional application No. 62/884,434, filed on Aug. 8, 2019.

(51) Int. Cl.
| | | |
|---|---|---|
| *G10L 15/22* | (2006.01) | |
| *G06F 40/211* | (2020.01) | |
| *G06F 40/237* | (2020.01) | |
| *G06F 40/253* | (2020.01) | |
| *G06F 40/279* | (2020.01) | |
| *G06F 40/295* | (2020.01) | |

(52) U.S. Cl.
CPC .......... *G06F 40/211* (2020.01); *G06F 40/237* (2020.01); *G06F 40/253* (2020.01); *G06F 40/279* (2020.01); *G06F 40/295* (2020.01); *G06F 40/30* (2020.01); *G10L 2015/223* (2013.01)

(56) References Cited

U.S. PATENT DOCUMENTS

| | | | |
|---|---|---|---|
| 8,606,581 | B1 | 12/2013 | Quast |
| 9,412,379 | B2 | 8/2016 | Helm |
| 9,922,642 | B2 | 3/2018 | Pitschel |
| 10,319,375 | B2 | 6/2019 | Fritz |
| 10,325,599 | B1 | 6/2019 | Naidu |
| 10,418,032 | B1 | 9/2019 | Mohajer |
| 10,581,765 | B2 | 3/2020 | Koukoumidis |
| 10,631,257 | B1 | 4/2020 | Serero |
| 10,674,001 | B1 | 6/2020 | Rao |
| 10,679,613 | B2 * | 6/2020 | Wabgaonkar ........... G10L 15/16 |
| 10,742,814 | B1 | 8/2020 | Bell |
| 10,749,822 | B2 | 8/2020 | D'Agostino |
| 10,771,407 | B2 | 9/2020 | Youssefi |
| 10,810,997 | B2 | 10/2020 | Yeracaris |
| 10,897,432 | B1 | 1/2021 | Estrada et al. |
| 11,087,094 | B2 * | 8/2021 | Chatterjee .............. G06N 5/022 |
| 11,159,457 | B2 | 10/2021 | Liang |
| 11,195,532 | B2 | 12/2021 | Teserra |
| 11,205,052 | B2 | 12/2021 | Sapugay |
| 11,205,422 | B2 | 12/2021 | Kwatra |
| 11,238,864 | B2 | 2/2022 | Fink et al. |
| 11,294,908 | B2 | 4/2022 | Pepakayala |
| 11,301,502 | B1 * | 4/2022 | Dijamco ............... G06F 16/334 |
| 11,393,475 | B1 * | 7/2022 | Aili ......................... G10L 15/22 |
| 11,423,235 | B2 | 8/2022 | Huang et al. |
| 2014/0214429 | A1 | 7/2014 | Pantel |
| 2014/0244712 | A1 * | 8/2014 | Walters .................. H04L 67/10 |
| | | | 709/202 |
| 2015/0255064 | A1 | 9/2015 | Fujii |
| 2017/0091629 | A1 | 3/2017 | Li |
| 2017/0242886 | A1 * | 8/2017 | Jolley .................. G06F 40/211 |
| 2018/0025726 | A1 | 1/2018 | Gatti De Bayser et al. |
| 2019/0043503 | A1 | 2/2019 | Bauer |
| 2019/0180258 | A1 | 6/2019 | Amar |
| 2019/0199658 | A1 | 6/2019 | Kim |
| 2019/0318730 | A1 | 10/2019 | Hazarika |
| 2019/0371304 | A1 | 12/2019 | Fritz |
| 2020/0013407 | A1 | 1/2020 | Chae |
| 2020/0019641 | A1 | 1/2020 | Tonetti |
| 2020/0151277 | A1 * | 5/2020 | Fisher ..................... G06T 17/00 |
| 2020/0152814 | A1 * | 5/2020 | Zuckerman ....... H01L 31/02168 |
| 2020/0160861 | A1 * | 5/2020 | Lee ..................... B60R 16/0373 |
| 2020/0184307 | A1 | 6/2020 | Lipka |
| 2020/0219491 | A1 | 7/2020 | Jarosz |
| 2020/0234700 | A1 | 7/2020 | Heltewig |
| 2020/0244700 | A1 | 7/2020 | Moon |
| 2020/0250247 | A1 | 8/2020 | Daianu |
| 2020/0259891 | A1 | 8/2020 | Abraham |
| 2020/0279561 | A1 | 9/2020 | Sheeder |
| 2020/0322320 | A1 | 10/2020 | Moon |
| 2020/0342866 | A1 | 10/2020 | Casado |
| 2020/0387825 | A1 | 12/2020 | Khan et al. |
| 2021/0166687 | A1 * | 6/2021 | Yoon ....................... G10L 15/30 |

FOREIGN PATENT DOCUMENTS

| | | |
|---|---|---|
| JP | 6480568 B2 | 3/2019 |
| WO | 2017192684 A1 | 11/2017 |
| WO | 2020146134 A1 | 7/2020 |
| WO | 2020157473 A1 | 8/2020 |

OTHER PUBLICATIONS

"Penn Treebank II Constituent Tags", Webpage, publication date unknown, accessed on Jun. 7, 2023 at URL: http://surdeanu.cs.arizona.edu/mihai/teaching/ista555-fall13/readings/PennTreebankConstituents.html.

"Stanford CoreNLP 3.9.2", Webpage, archived on Jul. 14, 2019 at URL: https://web.archive.org/web/20190714021752/http://corenlp.run/.

Bies et al., "Bracketing Guidelines For Treebank II Style Penn Treebank Project", University of Pennsylvania Department of Computer and Information Science Technical Report No. MS-CIS-95-06-07, Jan. 1995.

Cook, AI, "Using Bots to Route Customer Requests Based on Sentiment and Emotion", Blog, Oct. 12, 2016, Twilio Inc., 11 pages, (retrieved Nov. 10, 2020).

\* cited by examiner

SYSTEMS AND METHODS FOR PARSING MULTIPLE INTENTS IN NATURAL LANGUAGE SPEECH

CROSS-REFERENCE TO RELATED APPLICATIONS

This application claims priority to and is a continuation of U.S. patent application Ser. No. 16/988,130, filed Aug. 7, 2020, entitled "SYSTEMS AND METHODS FOR PARSING MULTIPLE INTENTS IN NATURAL LANGUAGE SPEECH," which claims the benefit of priority to U.S. Provisional Patent Application Ser. No. 62/884,434, filed Aug. 8, 2019, entitled "SYSTEMS AND METHODS FOR PARSING MULTIPLE INTENTS IN NATURAL LANGUAGE SPEECH," and to U.S. Provisional Patent Application Ser. No. 62/972,478, filed Feb. 10, 2020, entitled "SYSTEMS AND METHODS FOR PARSING MULTIPLE INTENTS IN NATURAL LANGUAGE SPEECH," the entire contents and disclosures of which are all hereby incorporated by reference in their entireties.

FIELD OF THE DISCLOSURE

The present disclosure relates to parsing multiple intents and, more particularly, to a network-based system and method for parsing separate intents in natural language speech.

BACKGROUND

In most cases people do not always speak in perfect sentences. They may use run-on sentences, colloquialisms, slang terms, and other adjustments to the normal rules of the language that they are either speaking or typing. In addition, multiple different people may say the exact same thing in multiple different ways, using different combinations and order of words. This may cause difficulties for chat programs, such as, automated phone systems or online chat bots. Many of these programs are only capable of understanding simple commands or sentences. Furthermore, these sentences may be stilted or awkward for the speaker. Accordingly, it is important to expand the capabilities of these automated phone and chat systems to improve their understanding of natural language queries and longer sentences to match how people actually speak. Additionally, it is important to ensure that these systems accurately interpret the statements, queries, and conversations made by the individual speaking or typing.

BRIEF SUMMARY

The present embodiments may relate to systems and methods for parsing separate intents in natural language speech. The system may include a speech analysis (SA) computer system and/or one or more user computer devices. In one aspect, the present embodiments may make a chat bot more conversational than conventional bots. For instance, with the present embodiments, a chat bot is provided that can understand longer sentences than with conventional techniques. This is accomplished by diagraming long sentences and/or by parsing sentences into multiple user intents and/or into shorter phrases.

The SA computer system may be configured to: (i) receive, from the user computer device, a verbal statement of the user including a plurality of words; (ii) translate the verbal statement into text; (iii) label each of the plurality of words in the verbal statement; (iv) detect one or more potential splits in the verbal statement; (v) divide the verbal statement into a plurality of intents based upon the one or more potential splits; (vi) generate a response based upon the plurality of intents; (vii) determine additional data needed from the user based upon the plurality of intents; (viii) determine a request to the user to request the additional data; (ix) translate the request into speech; (x) transmit the request in speech to the user computer device; (xi) detect the one or more potential splits based upon a word structure of the verbal statement; (xii) detect a plurality of potential splits base on one or more labels associated with the plurality of words in the verbal statement; and/or (xiii) reduce the plurality of potential splits based upon distance between each of the plurality of potential splits.

In one aspect, a computer system for parsing separate intents in natural language speech is provided. The computer system may include at least one processor in communication with at least one memory device. The computer system may be in communication with a user computer device associated with a user. The at least one processor may be programmed to: (i) receive, from the user computer device, a verbal statement of the user including a plurality of words; (ii) translate the verbal statement into text; (iii) label each of the plurality of words in the verbal statement; (iv) detect one or more potential splits in the verbal statement; (v) divide the verbal statement into a plurality of intents based on the one or more potential splits; and/or (vi) generate a response based upon the plurality of intents. The computer system may have additional, less, or alternate functionality, including that discussed elsewhere herein.

In another aspect a computer-implemented method for parsing separate intents in natural language speech is provided. The method may be implemented by a computer device including at least one processor in communication with at least one memory device. The computer device may be in communication with a user computer device associated with a user. The method may include: (i) receiving, from the user computer device, a verbal statement of the user including a plurality of words; (ii) translating the verbal statement into text; (iii) labeling each of the plurality of words in the verbal statement; (iv) detecting one or more potential splits in the verbal statement; (v) dividing the verbal statement into a plurality of intents based upon the one or more potential splits; and/or (vi) generating a response based upon the plurality of intents. The method may have additional, less, or alternate functionality, including that discussed elsewhere herein.

In yet another aspect, a non-transitory computer readable medium having computer-executable instructions embodied thereon for parsing separate intents in natural language speech is provided. When executed by at least one processor, the computer-executable instructions may cause the at least one processor to: (i) receive, from a user computer device, a verbal statement of a user including a plurality of words; (ii) translate the verbal statement into text; (iii) label each of the plurality of words in the verbal statement; (iv) detect one or more potential splits in the verbal statement; (v) divide the verbal statement into a plurality of intents based upon the one or more potential splits; and/or (vi) generate a response based upon the plurality of intents. The computer-executable instructions may have additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and are instrumentalities shown, wherein.

Figure 1:
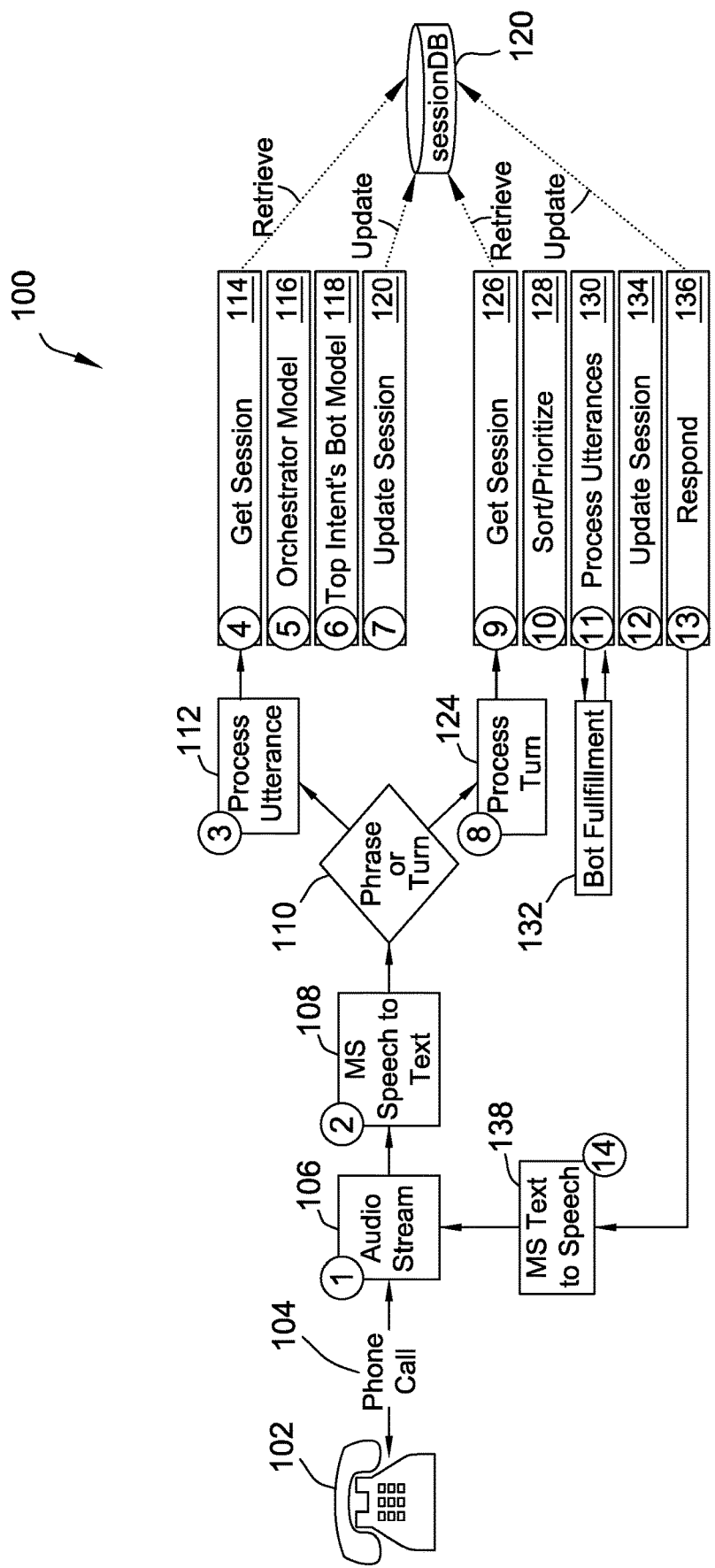
FIG. 1 illustrates a flow chart of an exemplary process of parsing intents in a conversation, in accordance with the present disclosure.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for parsing multiple intents and, more particularly, to a network-based system and method for parsing the separate intents in natural language speech. In one exemplary embodiment, the process may be performed by a speech analysis ("SA") computer device. In the exemplary embodiment, the SA computer device may be in communication with a user, such as, through an audio link or text-based chat program, through the user computer device, such as a mobile computer device. In the exemplary embodiment, the SA computer device may be in communication with a user computer device, where the SA computer device transmits data to the user computer device to be displayed to the user and receives the user's inputs from the user computer device.

In the exemplary embodiment, the SA computer device may receive a complete statement from a user. For the purposes of this discussion, the statement may be a complete sentence or a short answer to a query. The SA computer device may label each word of the statement based upon the word type. Then the SA computer device may analyze the statement to divide it up into utterances, which then may be analyzed to identify intents. For the purpose of this discussion, an intent is a phrase that includes a single idea, whereas an utterance is a phrase that may or may not include an idea. A statement may include multiple intents. The SA computer device or other computer device may then act on or respond to each individual intent. In the exemplary embodiment, the SA computer device may break up compound and complex statements into smaller utterances to be submitted for intent recognition. For example, the statement: "I want to extend my stay for my room number abc," would resolve into two utterances. The two utterances are "I want to extend my stay" and "for my room number abc." These utterances may then be analyzed to determine if they are intents.

Given a statement, the SA computer device may use constituency tree grammar structure to break the statement into smaller utterances. This is useful in situation where intents are better recognized in smaller utterances. As described herein, the statements may be diagrammed using constituency tree grammar structure. The diagrams may then be used for parsing the statements into smaller utterances.

Each statement provided may be parsed first based upon coordinating conjunction (CC), such as, but not limited to, and, or, etc. Secondly, the statement may be parsed based upon a preposition or subordinating conjunction (IN), such as, but not limited to, since, while, etc. Next the statement may be parsed based upon wh-adverbs (WRB), such as when, where, why, and also how. Finally, the statement may be parsed based upon the use of the word 'to' (TO). As splits occur, the SA computer device may accumulates the splits, and each subsequent split activity receives the accumulated splits so far. When a split occurs, in many cases, both resulting utterances are sent back through the method that split them in order to find if additional splits are needed. When splits are needed, the SA computer device may navigate up the constituency tree grammar structure to find the split location which will not leave dangling nodes in the structure.

For the CC processing, each side of the conjunction is may be checked for nouns and if present, the statement is not split. This accounts for names with "and" or such in them. In addition, there may be logic which checks for "I" and "I'm" to allow these nouns to be split when there is "significant" words on each side of the conjunction.

Processing INs and WRBs are straightforward. When they are found, a split may be made. For INs, the number of words between INs must be at least five for a split to occur. WRB includes wh-pronouns (WP), such as who, what, where, and also how.

In the exemplary embodiment, TOs are not automatically split. There must be at least two TOs and they must not be relatively close to each other in the tree structure. This is determined by looking at the parentage of each TO and determining if they are both inherited from the same S sentence fragment. If they are not close to one another, the split occurs on the second TO found.

In the exemplary embodiment, a user may use their user computer device to place a phone call. SA computer device may receive the phone call and interprets the user's speech. In other embodiments, the SA computer device may be in communication with a phone system computer device, where the phone system computer device receives the phone call and transmits the audio to SA computer device. In the exemplary embodiment, the SA computer device may be in communication with one or more computer devices that are capable of performing actions based upon the user's requests. In one example, the user may be placing a phone call to order a pizza. The additional computer devices may be capable of receiving the pizza order and informing the pizza restaurant of the pizza order.

In the exemplary embodiment, the audio stream may be received by the SA computer device via a websocket. In some embodiments, the websocket may be opened by the phone system computer device. In real-time, the SA computer device may use speech to text natural language processing to interpret the audio stream. In the exemplary embodiment, the SA computer device may interpret the translated text of the speech. When the SA computer device detects a long pause, the SA computer device may determine if the long pause is the end of a statement or the end of the user talking.

If the pause is the end of a statement, the SA computer device may flag (or tag) the text as a statement and processes the statement. The SA computer device may retrieve the resulting utterances from the session database. The SA computer device may identify the top intent by sending the utterance to an orchestrator model that knows the intents of the domain (without entities). The SA computer device may extract the entities from the identified intents. The SA computer device may store all of the information about the identified intents in the session database.

If the pause is the end of the user's talking, the SA computer device may process the user's statements (also known as the user's turn). The SA computer device may retrieve the session from the session database. The SA computer device may sort and prioritize all of the intents based upon stored business logic and pre-requisites. The SA computer device may process all of the intents in proper order and determines if there are any missing entities. In some embodiments, the SA computer device may use a bot fulfillment module to request the missing entities from the user. The SA computer device may update the sessions in the session database. The SA computer device may determine a response to the user based upon the statements made by the user. In some embodiments, the SA computer device may convert the text of the response back into speech before transmitting to the user, such as via the audio stream. In other embodiments, the SA computer device may display text or images to the user in response to the user's speech While the above describes the audio translation of speech, the systems described herein may also be used for interpreting text-based communication with a user, such as through a text-based chat program.

Exemplary Process for Parsing Intents in a Conversation

FIG. 1 illustrates a flow chart of an exemplary process 100 of parsing intents in a conversation, in accordance with the present disclosure. In the exemplary embodiment, process 100 is performed by a computer device, such as speech analysis ("SA") computer device 205 (shown in FIG. 2). In the exemplary embodiment, SA computer device 205 may be in communication with a user computer device 102, such as a mobile computer device. In this embodiment, SA computer device 205 may perform process 100 by transmitting data to the user computer device 102 to be displayed to the user and receives the user's inputs from user computer device 210.

In the exemplary embodiment, a user may use their user computer device 102 to place a phone call 104. SA computer device 205 may receive the phone call 104 and interprets the user's speech. In other embodiments, the SA computer device 205 may be in communication with a phone system computer device, where the phone system computer device receives the phone call 104 and transmits the audio to SA computer device 205. In the exemplary embodiment, the SA computer device 205 may be in communication with one or more computer devices that are capable of performing actions based upon the user's requests. In one example, the user may be placing a phone call 104 to order a pizza. The additional computer devices may be capable of receiving the pizza order, and informing the pizza restaurant of the pizza order.

In the exemplary embodiment, the audio stream 106 may be received by the SA computer device 205 via a websocket. In some embodiments, the websocket is opened by the phone system computer device (step 1 in FIG. 1). In real-time, the SA computer device 205 may use speech to text natural language processing 108 to interpret the audio stream 106. In the exemplary embodiment, the SA computer device 205 may interpret the translated text of the speech (step 2 in FIG. 1). When the SA computer device 205 detects a long pause, the SA computer device 205 may determine 110 if the long pause is the end of a statement or the end of the user talking (step 3 in FIG. 1). For the purposes of this discussion, the statement may be a complete sentence or a short answer to a query.

If the pause is the end of statement, the SA computer device 205 may flag (or tag) the text as a statement and processes 112 the statement. The SA computer device 205 may retrieve 114 the resulting utterances from the session database 122 (step 4 in FIG. 1). The SA computer device 205 may identify 116 the top intent by sending the utterance to an orchestrator model that knows the intents of the domain, without entities (step 5 in FIG. 1). For the purpose of this discussion, an intent is a phrase that includes a single idea, whereas an utterance is a phrase that may or may not include an idea. A statement may include multiple intents. The SA computer device 205 may extract 118 the entities from the identified intents (step 6 in FIG. 1). The SA computer device 205 may store 120 all of the information about the identified intents in the session database 122 (step 7 in FIG. 1).

If the pause is the end of the user's talking, the SA computer device 205 may process 124 the user's statements, also known as the user's turn (step 8 in FIG. 1). The SA computer device 205 may retrieve 126 the session from the session database 122 (step 9 in FIG. 1). The SA computer device 205 may sort and prioritize 128 all of the intents based upon stored business logic and pre-requisites (step 10 in FIG. 1). The SA computer device 205 may process 130 all of the intents in proper order and determines if there are any missing entities (step 11 in FIG. 1). In some embodiments, the SA computer device 205 may use a bot fulfillment module 132 to request the missing entities from the user. The SA computer device 205 may update 134 the sessions in the session database 122 (step 12 in FIG. 1). The SA computer device 205 may determine 136 a response to the user based upon the statements made by the user (step 13 in FIG. 1). In some embodiments, the SA computer device 205 may convert 138 the text of the response back into speech before transmitting to the user, such as via the audio stream 106 (step 14 in FIG. 1). In other embodiments, the SA computer device 205 may display text or images to the user in response to the user's speech.

In the exemplary embodiment, process 100 may break up compound and complex statements into smaller utterances to be submitted for intent recognition. For example, the statement: "I want to extend my stay for my room number abc," would resolve into two utterances. The two utterances are "I want to extend my stay" and "for my room number abc." These utterances are then analyzed to determine if they are intents.

Given a statement, the SA computer device 205 may use constituency tree grammar structure to break a statement into smaller utterances. This is useful in situation where intents are better recognized on smaller utterances. As described herein, the statements are diagrammed using constituency tree grammar structure. The diagrams are then used for parsing the statements into smaller utterances.

Each statement provided may be parsed first based upon coordinating conjunction (CC), such as, but not limited to, and, or, etc. Secondly, the statement may be parsed based upon a preposition or subordinating conjunction (IN), such as, but not limited to, since, while, etc. Next the statement may be parsed based upon wh-adverbs (WRB), such as when, where, why, and also how. Finally, the statement may be parsed based upon the use of the word 'to' (TO). As splits occur, they may be accumulated, and each subsequent split activity receives the accumulated splits so far. When a split occurs, in many cases, both resulting utterances may be sent back through the method that split them in order to find if additional splits are needed. When splits are needed, the SA computer device 205 may navigate up the constituency tree grammar structure to find the split location which will not leave dangling nodes on the tree structure.

For the CC processing, each side of the conjunction is checked for nouns and if present, the statement is not split. This accounts for names with "and" or such in them. In addition, there is logic which checks for "I" and "I'm" to allow these nouns to be split when there is "significant" words on each side of the conjunction.

Processing INs and WRBs are straightforward. When they are found, a split is made. For INs, the number of words between INs must be at least five for a split to occur. WRB includes wh-pronouns (WP), such as who, what, where, and also how.

In the exemplary embodiment, TOs are not automatically split. There must be at least two TOs and they must not be relatively close to each other in the tree structure. This is determined by looking at the parentage of each TO and determining if they are both inherited from the same S sentence fragment. If they are not close to one another, the split occurs on the second TO found.

In the exemplary embodiment, the SA computer device 205 may receive a complete statement from a user. The SA computer device 205 may label each word of the statement based upon the word type. Then the SA computer device 205 may analyze the statement to divide it up into utterances, which are then analyzed to identify intents. The SA computer device 205 or other computer device may then be able to act on or respond to each individual intent.

While the above describes the audio translation of speech, the systems described herein may also be used for interpreting text-based communication with a user, such as through a text-based chat program.

Exemplary Computer Network

Figure 2:
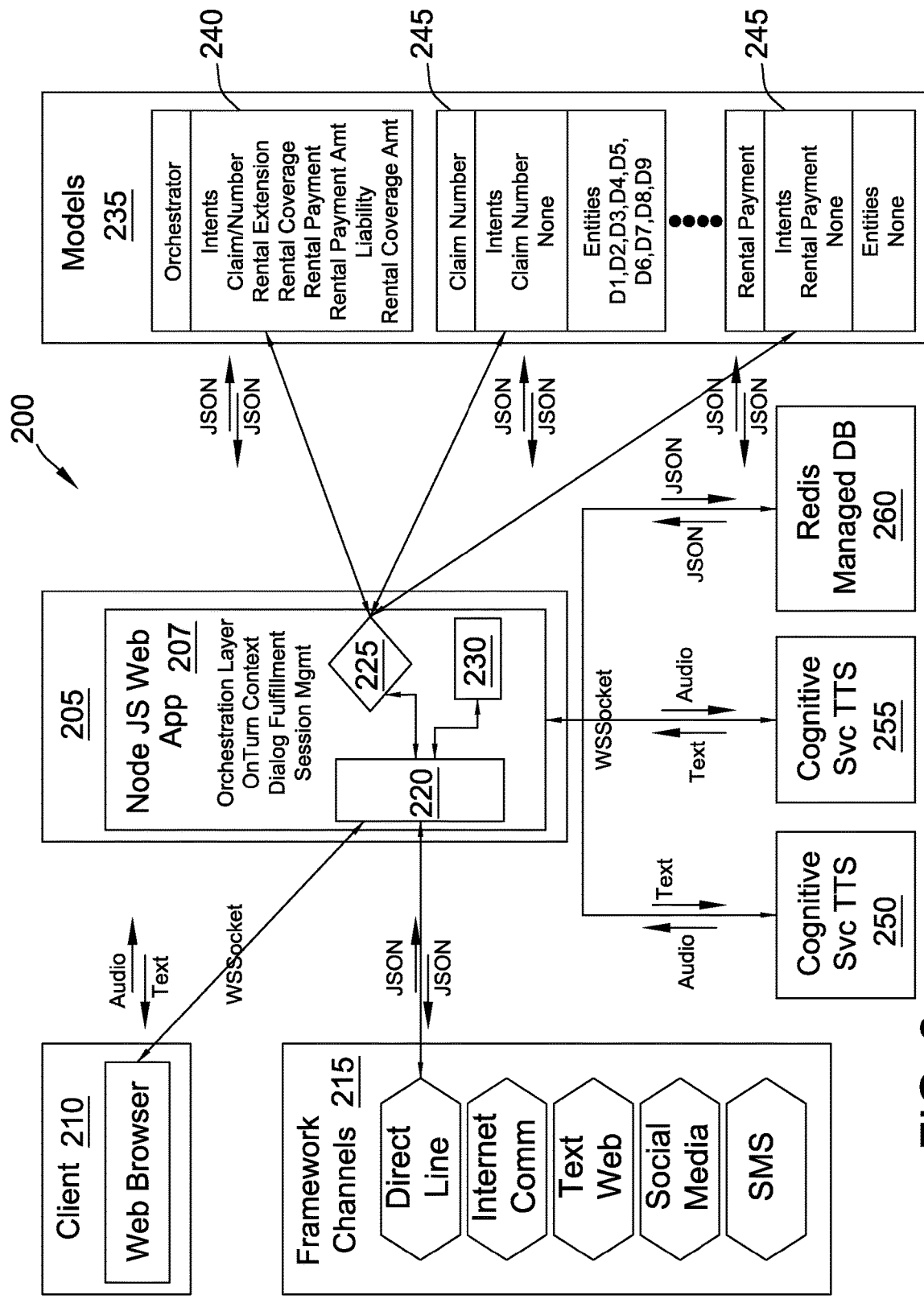
FIG. 2 illustrates a simplified block diagram of an exemplary computer architecture for implementing the processes shown in FIG. 1.

FIG. 2 illustrates a simplified block diagram of an exemplary computer architecture 200 for implementing the processes 100 shown in FIG. 1. In the exemplary embodiment, computer architecture 200 may be used for parsing intents in a conversation.

In the exemplary embodiment, the computer architecture 200 may include a speech analysis ("SA") computer device 205. In the exemplary embodiment, SA computer device 205 may execute a web app 207 or 'bot' for analyzing speech. In some embodiments, the web app 207 may include an orchestration layer, an onturn Context module, a dialog fulfillment module, and a session management module. In some embodiments, process 100 may be executed using the web app 207. In the exemplary embodiment, the SA computer device 205 may be in communication with a user computer device 210, where the SA computer device 205 is capable of receiving audio from and transmitting either audio or text to the user computer device 210. In other embodiments, the SA computer device 205 may be capable of communicating with the user via one or more framework channels 215. These channels 215 may include, but are not limited to, direct lines or voice chat via a program such a as Skype, text chats, SMS messages, or other connections.

In the exemplary embodiment, the SA computer device 205 may receive conversation data, such as audio, from the user computer device 210, the framework channels 215, or a combination of the two. The SA computer device 205 may use internal logic 220 to analyze the conversation data. The SA computer device 205 may determine 225 whether the pauses in the conversation data represents the end of a statement or a user's turn of talking. The SA computer device 205 may fulfill 230 the request from the user based upon the analyzed and interpreted conversation data.

In some embodiments, the SA computer device 205 may be in communication with a plurality of models 235 for analysis. The models 235 may include an orchestrator 240 for analyzing the different intents and then parsing the intents into data 245. In insurance embodiments, the orchestrator 240 may parse the received intents into different categories of data 245. In this example, the orchestrator 240 may recognize categories of data 245 including: claim number, rental extension, rental coverage, rental payments, rental payment amount, liability, and rental coverage amount.

In some embodiments, the SA computer device 205 may be in communication with a text to speech (TTS) service module 250 and a speech to text (STT) service module 255. In some embodiments, the SA computer device 205 may use these service modules 250 and 255 to perform the translation between speech and text. In some embodiments, the SA computer device 205 may be also in communication with one or more databases 260. In some embodiments, database 260 may be similar to session database 122 (shown in FIG. 1).

In the exemplary embodiment, user computer devices 210 may be computers that include a web browser or a software application, which enables user computer devices 210 to access remote computer devices, such as SA computer device 205, using the Internet, phone network, or other network. More specifically, user computer devices 210 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

User computer devices 210 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, user computer device 210 may be in communication with a microphone. In some of these embodiments, the microphone is integrated into user computer device 210. In other embodiments, the microphone may be a separate device that is in communication with user computer device 210, such as through a wired connection, i.e. a universal serial bus (USB) connection.

A database server (not shown) may be communicatively coupled to database 260 that stores data. In one embodiment, database 260 may include parsed data 245, logic 220 for parsing intents, conversation information, or other information as needed to perform the operations described herein. In the exemplary embodiment, database 260 may be stored remotely from SA computer device 205. In some embodiments, database 260 may be decentralized. In the exemplary embodiment, the user may access database 260 via user computer device 210 by logging onto SA computer device 205, as described herein.

SA computer device 205 may be communicatively coupled with one or more user computer devices 210. In some embodiments, SA computer device 205 may be associated with, or is part of a computer network associated with an insurance provider. In other embodiments, SA computer device 205 may be associated with a third party and is merely in communication with the insurer network computer devices. More specifically, SA computer device 205 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

SA computer device 205 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, SA computer device 205 may host an application or website that allows the user to access the functionality described herein. In some further embodiments, user computer device 210 may include an application that facilitates communication with SA computer device 205.

Exemplary Application Architecture

Figure 3:
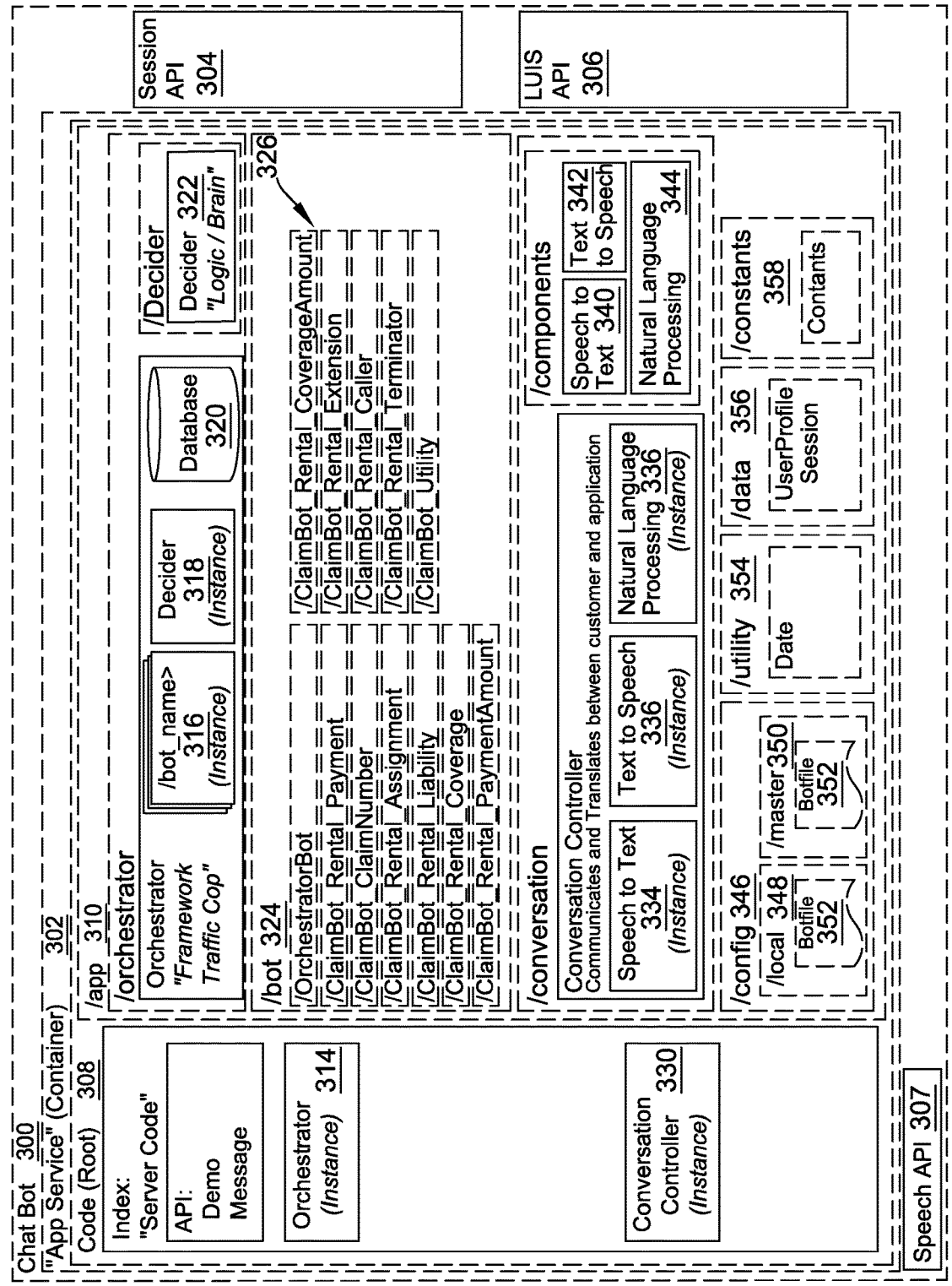
FIG. 3 illustrates a simplified block diagram of a chat application as shown in FIG. 2, in accordance with the present disclosure.

FIG. 3 illustrates a simplified block diagram of a chat application 300 as shown in FIG. 2, in accordance with the present disclosure. In the exemplary embodiment, chat application (also known as chat bot) 300 is executed on SA computer device 205 (shown in FIG. 2) and is similar to web app 207.

In the exemplary embodiment, the chat application 300 may execute a container 302 such as "app service." The chat application 300 may include application programming interfaces (APIs) for communication with various systems, such as, but not limited to, a Session API 304, a model API 306 for communicating with the models 235 (shown in FIG. 2), and a speech API 307.

The container may include the code 308 and the executing app 310. The executing app 310 may include an orchestrator 312 which may orchestrate communications with the frameworks 215 (shown in FIG. 2). An instance 314 of the orchestrator 312 may be contained in the code 308. The orchestrator 312 may include multiple instances of bots 316, which may be bots 326. The orchestrator 312 may also include a decider instance 318 of decider 322. The decider 322 may contain the logic for routing information and controlling bots 326. The orchestrator 312 also may include access to one or more databases 320, which may be similar to session database 122 (shown in FIG. 1). The executing app 310 may include a bot container 324 which includes a plurality of different bots 326, each of which has its own functionality. In some embodiments, the bots 326 are each programmed to handle a different type of data 245 (shown in FIG. 2).

The executing application 310 may also contain a conversation controller 328 for controlling the communication between the customer/user and the applications using the data 245. An instance 330 of the conversation controller 328 may be stored in the code 308. The conversation controller 328 may control instances of components 332. For example, there may be an instance 334 of a speech to text component 340, an instance 336 of a text to speech component 342, and an instance 338 of a natural language processing component 344.

The executing application may also include config files 346. These may include local 348 and master 350 botfiles 352. The executing application 310 may further include utility information 354, data 356, and constants 358 to execute its functionality.

The above description is a simplified description of a chat application 300 that may be used with the systems and methods described herein. However, the chat application 30 may include less or more functionality as needed.

Exemplary Client Device

Figure 4:
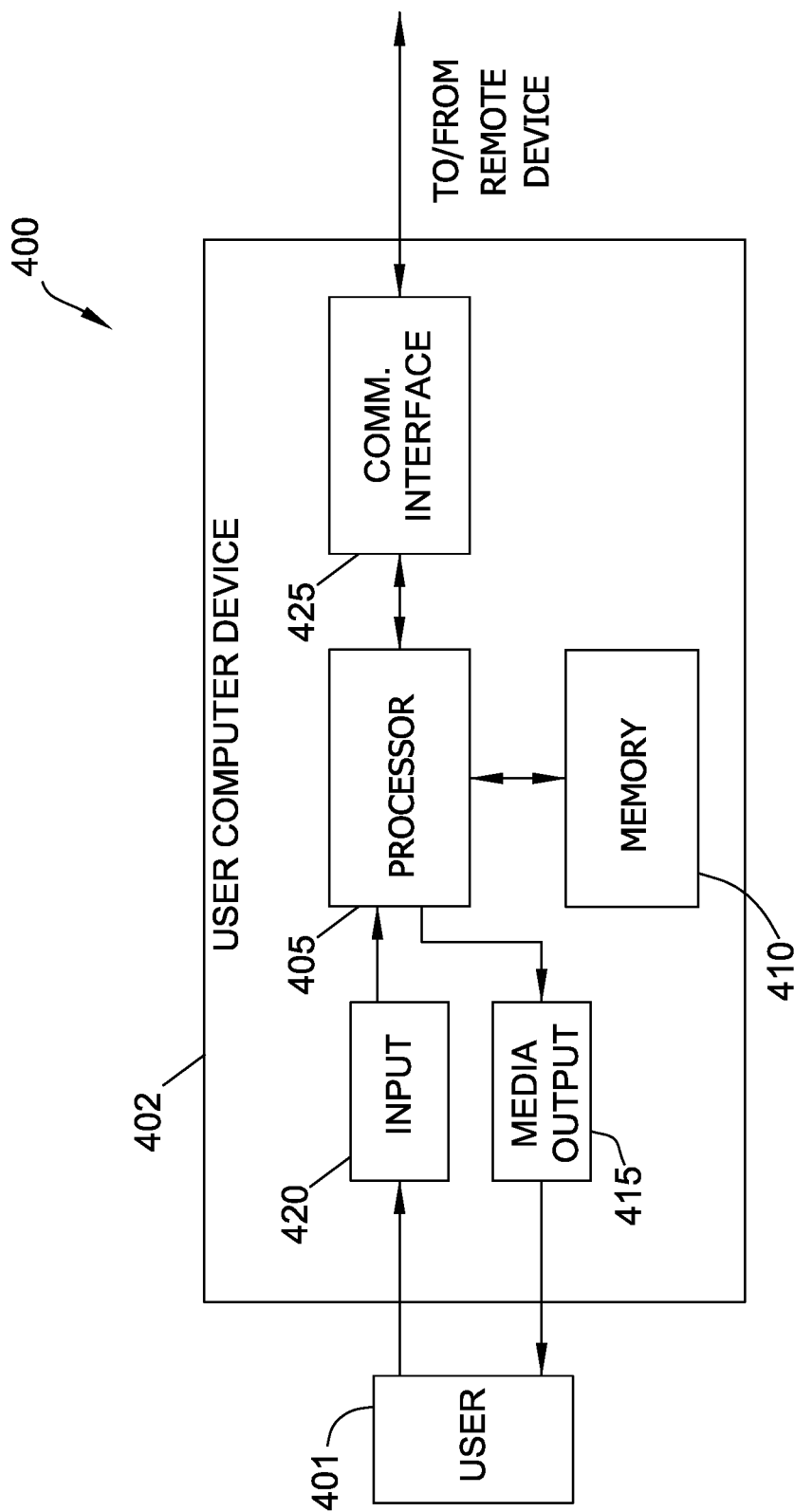
FIG. 4 illustrates an exemplary configuration of a user computer device, in accordance with one embodiment of the present disclosure.

FIG. 4 depicts an exemplary configuration 400 of user computer device 402, in accordance with one embodiment of the present disclosure. In the exemplary embodiment, user computer device 402 may be similar to, or the same as, user computer device 102 (shown in FIG. 1) and user computer device 210 (shown in FIG. 2). User computer device 402 may be operated by a user 401. User computer device 402 may include, but is not limited to, user computer devices 102, user computer device 210, and SA computer device 205 (shown in FIG. 2). User computer device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or transaction data to be stored and retrieved. Memory area 410 may include one or more computer readable media.

User computer device 402 may also include at least one media output component 415 for presenting information to user 401. Media output component 415 may be any component capable of conveying information to user 401. In some embodiments, media output component 415 may include an output adapter (not shown) such as a video adapter and/or an audio adapter. An output adapter may be operatively coupled to processor 405 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 415 may be configured to present a graphical user interface (e.g., a web browser and/or a client application) to user 401. A graphical user interface may include, for example, an interface for viewing instructions or user prompts. In some embodiments, user computer device 402 may include an input device 420 for receiving input from user 401. User 401 may use input device 420 to, without limitation, provide information either through speech or typing.

Input device 420 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 415 and input device 420.

User computer device 402 may also include a communication interface 425, communicatively coupled to a remote device such as SA computer device 205 (shown in FIG. 2). Communication interface 425 may include, for example, a wired or wireless network adapter and/or a wireless data transceiver for use with a mobile telecommunications network.

Stored in memory area 410 are, for example, computer readable instructions for providing a user interface to user 401 via media output component 415 and, optionally, receiving and processing input from input device 420. A user interface may include, among other possibilities, a web browser and/or a client application. Web browsers enable users, such as user 401, to display and interact with media and other information typically embedded on a web page or a website from SA computer device 205. A client application may allow user 401 to interact with, for example, SA computer device 205. For example, instructions may be stored by a cloud service, and the output of the execution of the instructions sent to the media output component 415.

Exemplary Server Device

Figure 5:
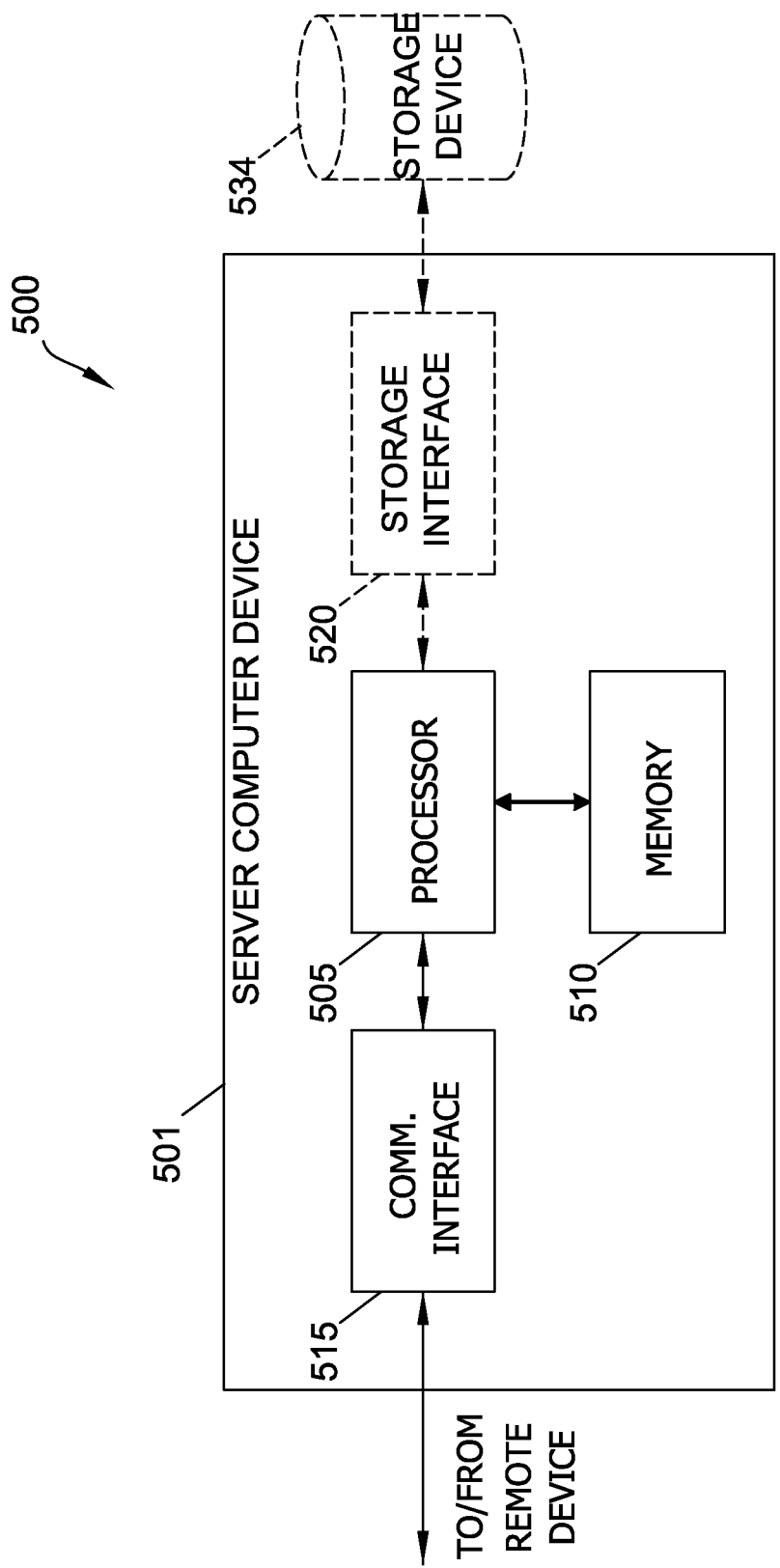
FIG. 5 illustrates an exemplary configuration of a server computer device, in accordance with one embodiment of the present disclosure.

FIG. 5 depicts an exemplary configuration 500 of a server computer device 501, in accordance with one embodiment of the present disclosure. In the exemplary embodiment, server computer device 501 may be similar to, or the same as, SA computer device 205 (shown in FIG. 2). Server computer device 501 may also include a processor 505 for executing instructions. Instructions may be stored in a memory area 510. Processor 505 may include one or more processing units (e.g., in a multi-core configuration).

Processor 505 may be operatively coupled to a communication interface 515 such that server computer device 501 is capable of communicating with a remote device such as another server computer device 501, SA computer device 205, and user computer devices 210 (shown in FIG. 2) (for example, using wireless communication or data transmission over one or more radio links or digital communication channels). For example, communication interface 515 may receive requests from user computer devices 210 via the Internet, as illustrated in FIG. 3.

Processor 505 may also be operatively coupled to a storage device 534. Storage device 534 may be any computer-operated hardware suitable for storing and/or retrieving data, such as, but not limited to, data associated with session database 122 (shown in FIG. 1) and database 320 (shown in FIG. 3). In some embodiments, storage device 534 may be integrated in server computer device 501. For example, server computer device 501 may include one or more hard disk drives as storage device 534.

In other embodiments, storage device 534 may be external to server computer device 501 and may be accessed by a plurality of server computer devices 501. For example, storage device 534 may include a storage area network (SAN), a network attached storage (NAS) system, and/or multiple storage units such as hard disks and/or solid state disks in a redundant array of inexpensive disks (RAID) configuration.

In some embodiments, processor 505 may be operatively coupled to storage device 534 via a storage interface 520. Storage interface 520 may be any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Processor 505 may execute computer-executable instructions for implementing aspects of the disclosure. In some embodiments, the processor 505 may be transformed into a special purpose microprocessor by executing computer-executable instructions or by otherwise being programmed. For example, the processor 505 may be programmed with the instruction such as illustrated in FIG. 1.

Exemplary Computer Device

Figure 6:
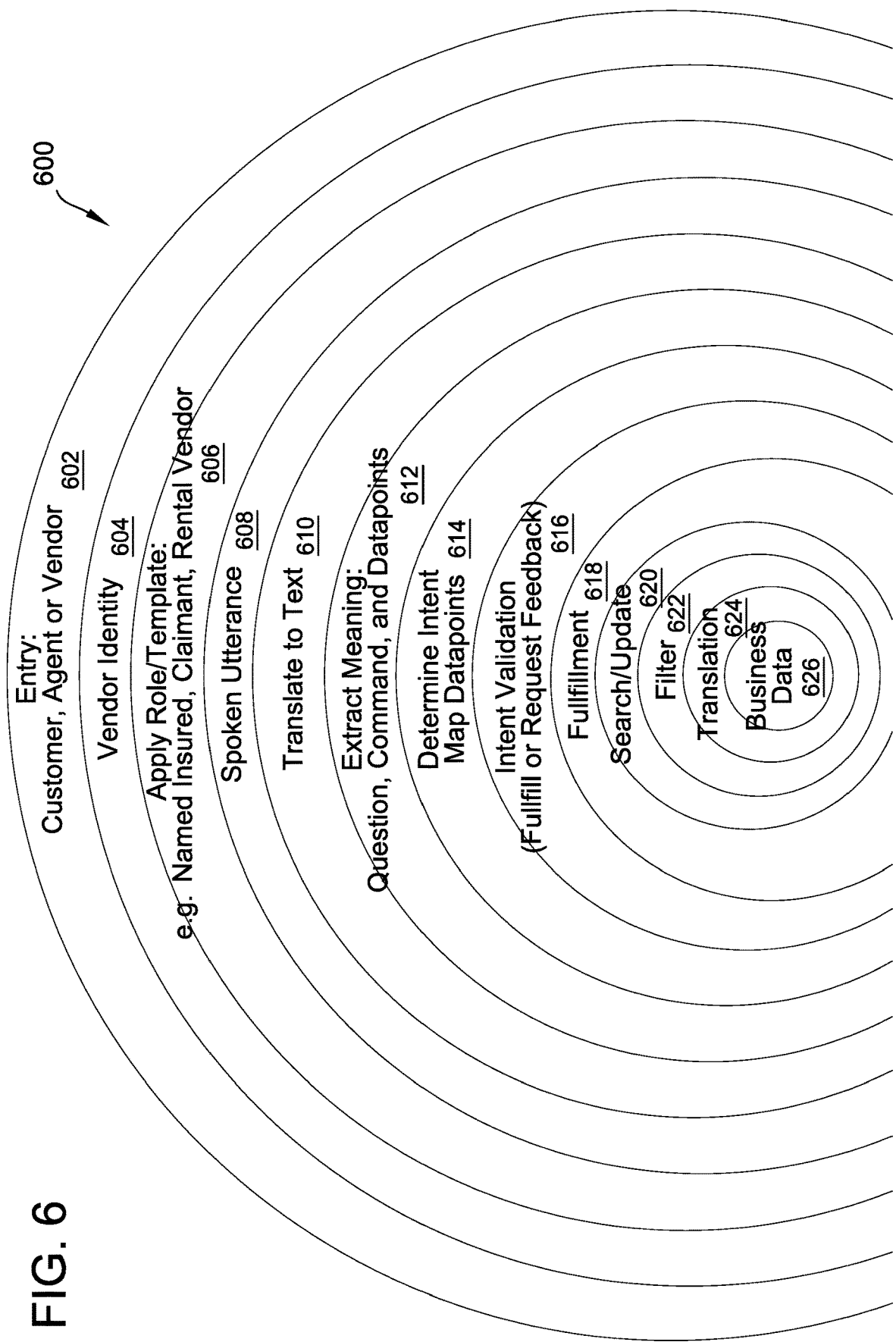
FIG. 6 illustrates a diagram of exemplary components of parsing intents in a conversation in accordance with the process shown in FIG. 1.

FIG. 6 illustrates a diagram of layers of activities 600 for parsing intents in a conversation in accordance with the process 100 (shown in FIG. 1) using the system 200 (shown in FIG. 2). In the exemplary embodiment, an entity 602, such as a customer, agent, or vendor, may initiate communication. The system 200 may verify 604 the identity of the entity 602. The system 200 may apply 606 a role or template to the entity 602. This role may include, but is not limited to, named insured, claimant, a rental vendor, etc. The system 200 may receive a spoken statement from the entity 602 which is broken down into one or more spoken utterances 608. The system 200 may translate 610 the spoken utterance 608 into text. The system 200 may then extract 612 meaning from the translated utterance 608. This meaning may include, but is not limited to, whether the utterance 608 is a question, command, or data point.

The system 200 may determine 614 the intents contained within the utterance 608. The system 200 then may validate 616 the intent and determine if it fulfills the system 200 or if feedback from the entity 602 is required. If the system 200 is fulfilled 618, then the data may be searched and updated, such as in the session database 122 (shown in FIG. 1). The data may be then filtered 622 and the translated data 624 may be stored as business data 626.

Exemplary Processed Text

Figure 7:
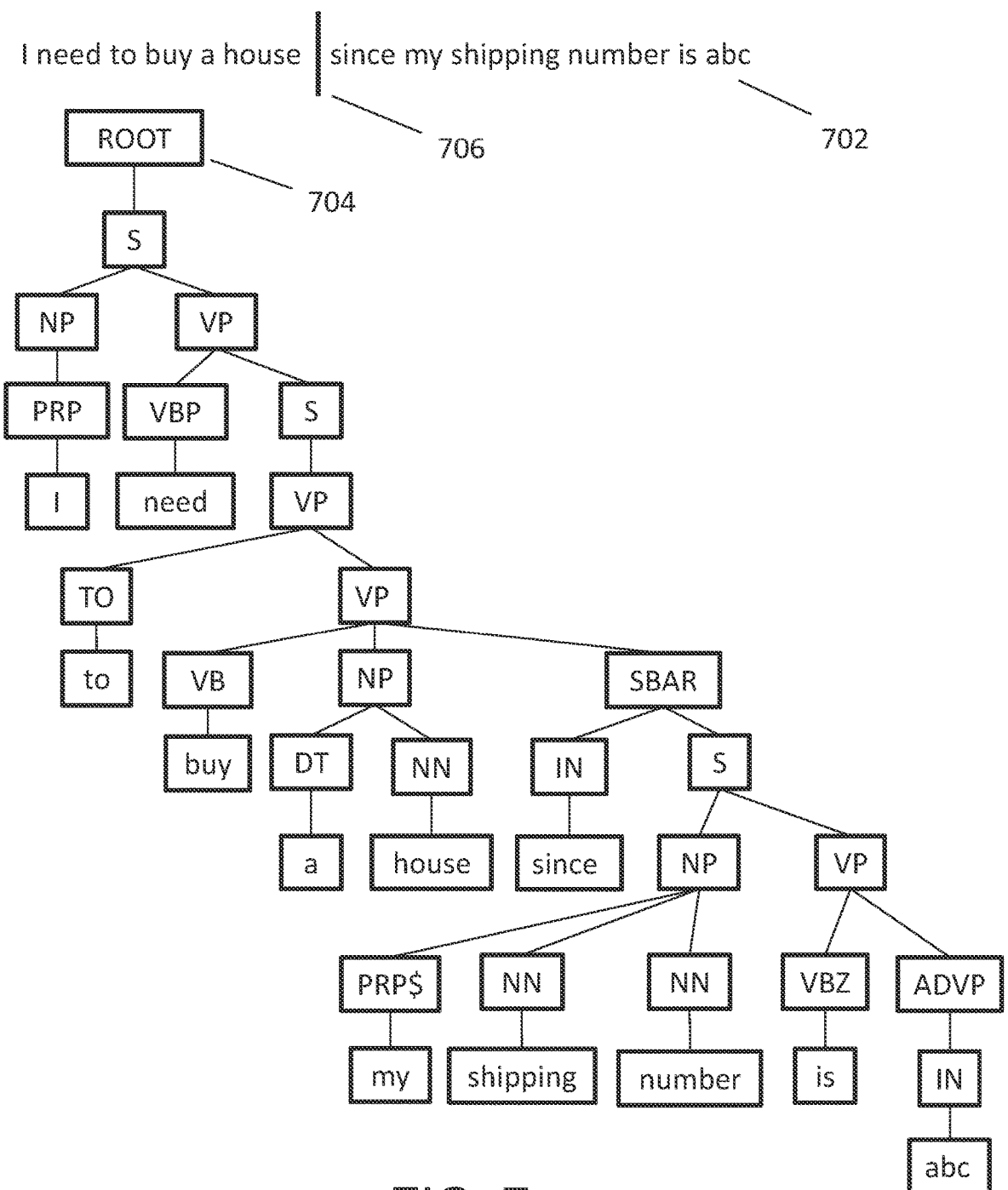
FIG. 7 illustrates exemplary results of the process shown in FIG. 1 using the system shown in FIG. 2.

FIG. 7 illustrates exemplary results of the process 100 (shown in FIG. 1) using the system 200 (shown in FIG. 2). Given a statement, process 100 may be used to break the statement into smaller utterances.

For the purposes of this discussion, the charts shown in FIGS. 7-16 will use the following abbreviations of interest. ROOT stands for the highest node in the tree. S stands for a simple declarative clause. SBAR stands for a clause introduced by subordinating conjunction. CC stands for a coordinating conjunction (and, or, etc.). IN stands for a preposition or subordinating conjunction (since, while, etc.). WRB stands for a Wh-adverb (when, where, why, etc., and also how.). WP stands for a Wh-pronoun. TO stands for the word to. NN stands for a noun. NP stands for a proper noun.

NNS stands for a plural noun. NNP stands for a singular proper noun. NNPS stands for a plural proper noun. And CD stands for a Cardinal number. The charts shown in FIGS. 7-16 are similar to charts generated using the constituency parse functionality of Stanford's CoreNLP 3.9.2 tool.

In FIG. 7, a statement 702 of "I need to buy a house since my shipping number is abc" is analyzed. Using process 100, the words in the statement 702 are labeled and graphed 704. Using the process 100, the first step is to look for coordinating conjunction (CC), of which there are none. Next, the statement 702 is parsed based upon a preposition or subordinating conjunction (IN), which there is one, the word 'since.' Then the statement 702 is analyzed for wh-adverbs (WRB), and there are none in statement 702. Finally the statement 702 is parsed based upon the use of the word 'to' (TO); however, since there is only one 'to', this does not generate a split. In statement 702, there is only one split, which is at the word since. Accordingly, the final split 706 is placed before that word.

Exemplary Processed Text

Figure 8:
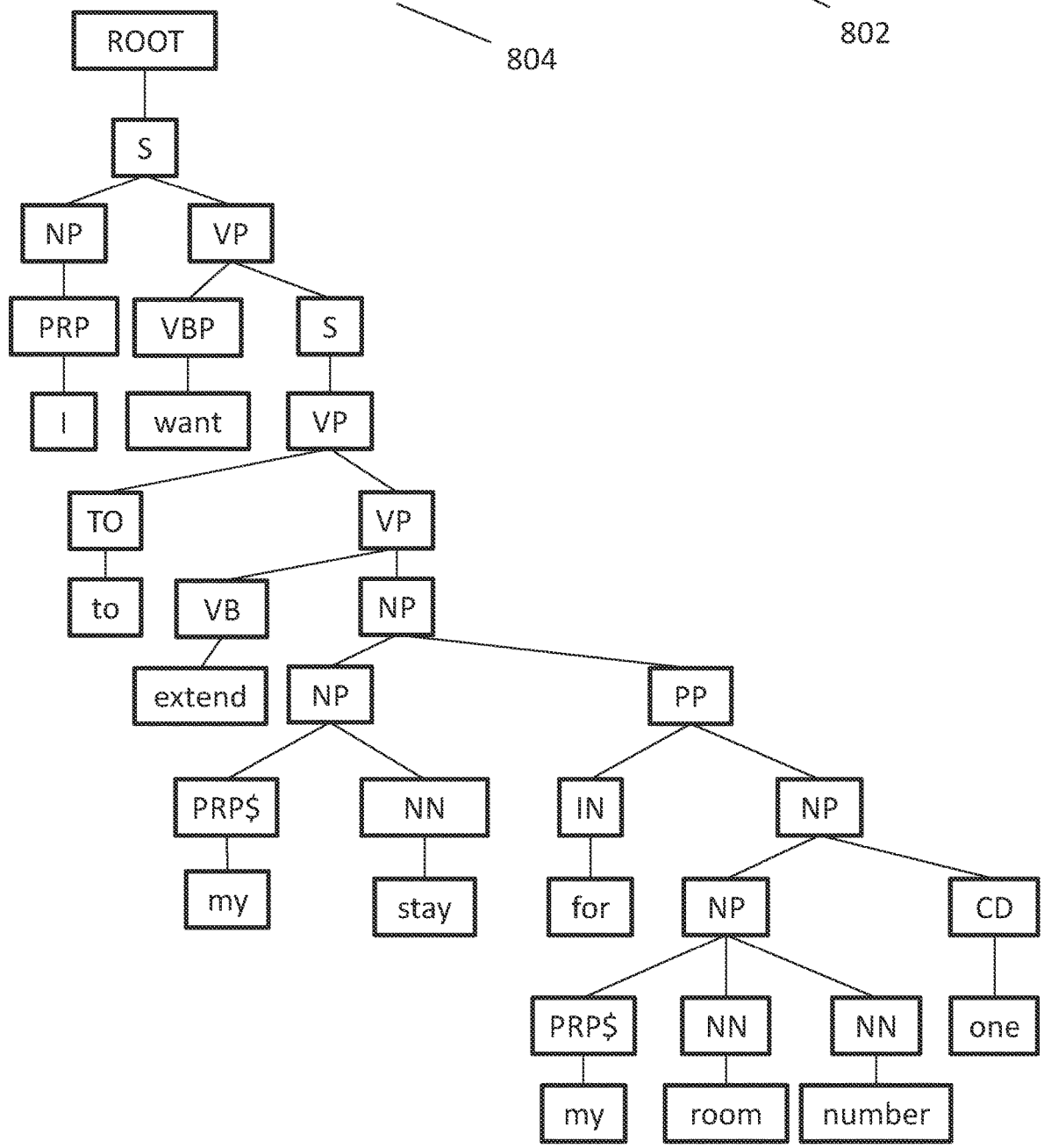
FIG. 8 illustrates exemplary results of the process shown in FIG. 1 using the system shown in FIG. 2.

FIG. 8 illustrates exemplary results of the process 100 (shown in FIG. 1) using the system 200 (shown in FIG. 2). In FIG. 8, the statement 802 "I want to extend my stay for my room number one" is analyzed.

The first step is to look for coordinating conjunction (CC), of which there are none. Next, the statement is parsed based upon a preposition or subordinating conjunction (IN), which there is one, the word 'for.' Then the statement 802 is analyzed for wh-adverbs (WRB), and there are none. Finally, the statement 802 is parsed based upon the use of the word 'to' (TO); however, since there is only one 'to', this does not generate a split. In statement 802, there is only one split, which is at the word for. Accordingly, the final split 804 is placed before that word.

Exemplary Processed Text

Figure 9:
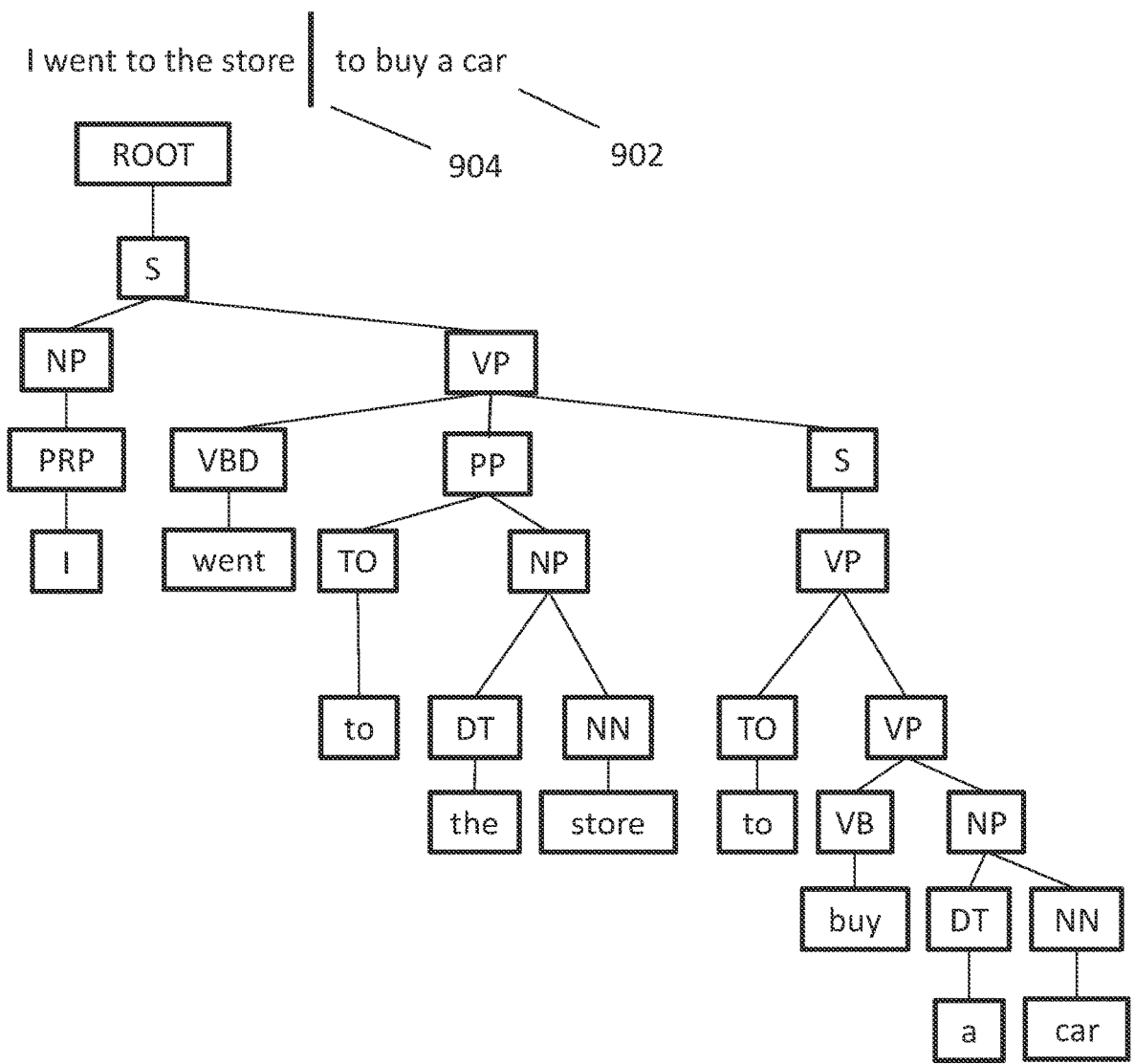
FIG. 9 illustrates exemplary results of the process shown in FIG. 1 using the system shown in FIG. 2.

FIG. 9 illustrates exemplary results of the process 100 (shown in FIG. 1) using the system 200 (shown in FIG. 2). In FIG. 9, the statement 902 "I went to the store to buy a car" is analyzed.

The first step is to look for coordinating conjunction (CC), of which there are none. Next, the statement is parsed based upon a preposition or subordinating conjunction (IN), which there is none. Then the statement 802 is analyzed for wh-adverbs (WRB), and there are none. Finally, the statement 902 is parsed based upon the use of the word 'to' (TO) and there are two TOs. Next, the distance between the two TOs is analyzed. Since they are part of separate sentence fragments S, the second TO is chosen for the split. Since there is only one split, the final split 904 is placed before the second TO.

Exemplary Processed Text

Figure 10:
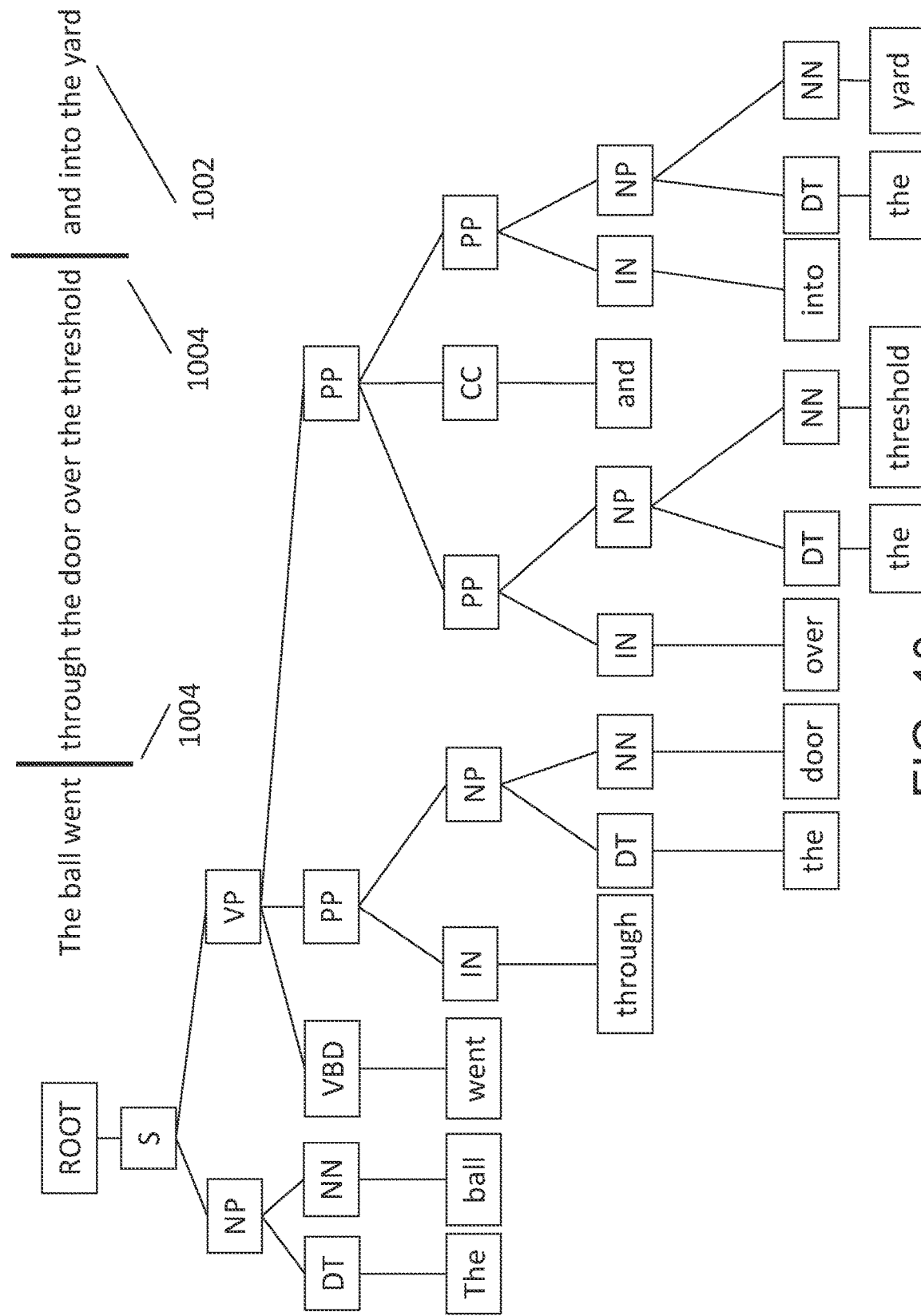
FIG. 10 illustrates exemplary results of the process shown in FIG. 1 using the system shown in FIG. 2.

FIG. 10 illustrates exemplary results of the process 100 (shown in FIG. 1) using the system 200 (shown in FIG. 2). In FIG. 10, the statement 1002 "The ball went through the door over the threshold and into the yard" is analyzed.

The first step is to look for coordinating conjunction (CC), of which there is one. Next, the statement is parsed based upon a preposition or subordinating conjunction (IN), which there are three, the words 'through,' 'over', and 'into.' However, the number of leaves must be at least five between the words for the split to occur. Since the word 'over' is only three words after the word 'through,' no split occurs at the word 'over." Then the statement 1002 is analyzed for wh-adverbs (WRB), and there are none. Finally, the statement 1002 is parsed based upon the use of the word 'to' (TO); of which there are none. In statement 1002, there are three splits. Two of them are right next to each other, so those two are combined into one. Accordingly, the final splits 1004 are placed before the word 'though' and the word 'and.'

Exemplary Processed Text

Figure 11:
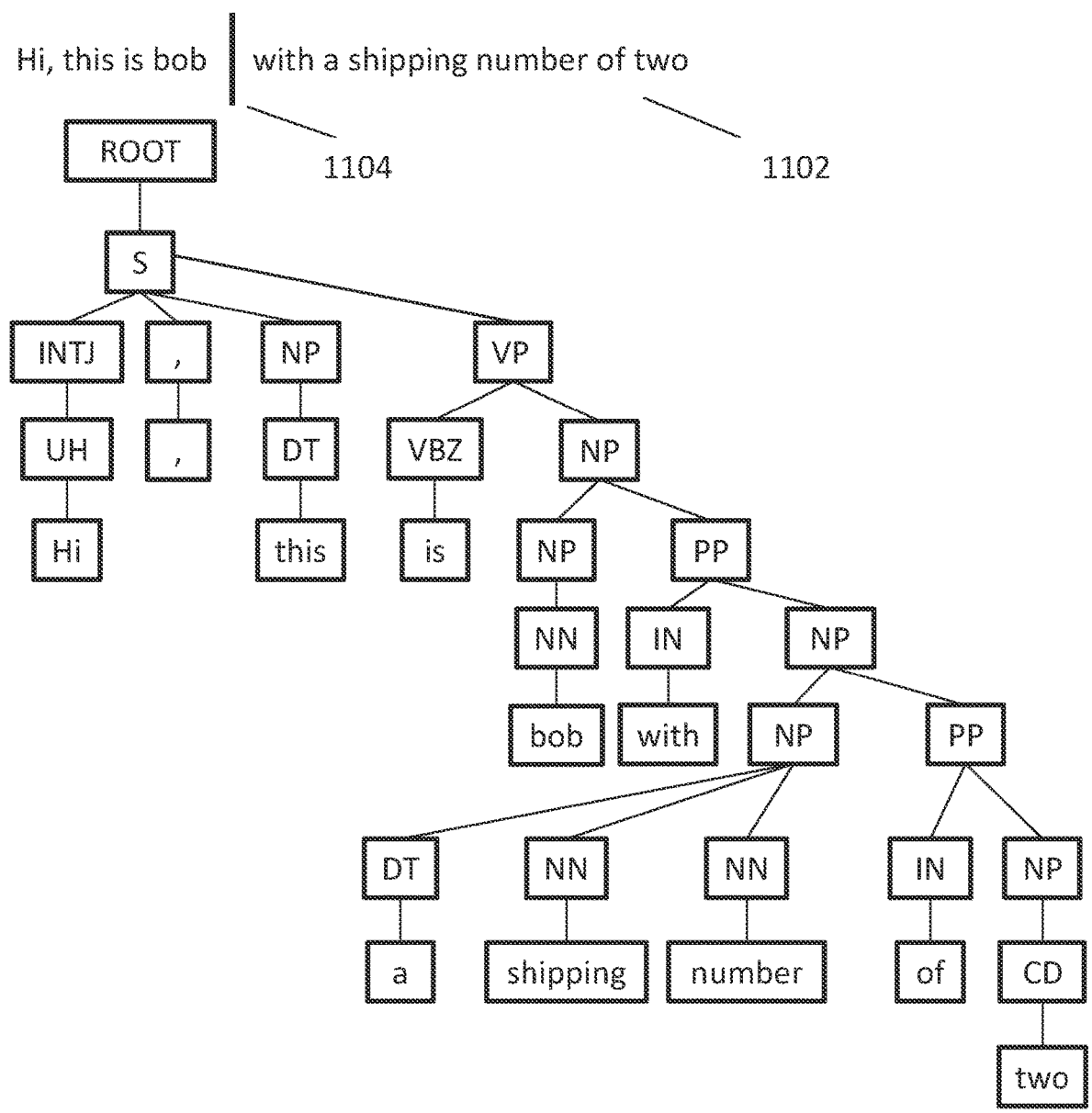
FIG. 11 illustrates exemplary results of the process shown in FIG. 1 using the system shown in FIG. 2.

FIG. 11 illustrates exemplary results of the process 100 (shown in FIG. 1) using the system 200 (shown in FIG. 2). In FIG. 11, the statement 1102 "Hi, this is bob, with a shipping number of two" is analyzed.

The first step is to look for coordinating conjunction (CC), of which there are none. Next, the statement is parsed based upon a preposition or subordinating conjunction (IN), which there are two, the words 'with' and 'of.' However, the number of leaves must be at least five between the words for the split to occur. Since the word 'of' is only four words after the word 'with,' no split occurs at the word 'of." Then the statement 1102 is analyzed for wh-adverbs (WRB), and there are none. Finally, the statement 1102 is parsed based upon the use of the word 'to' (TO); of which there are none. Since there is only one split, the final split 1104 is placed at the word 'with.'

Exemplary Processed Text

Figure 12:
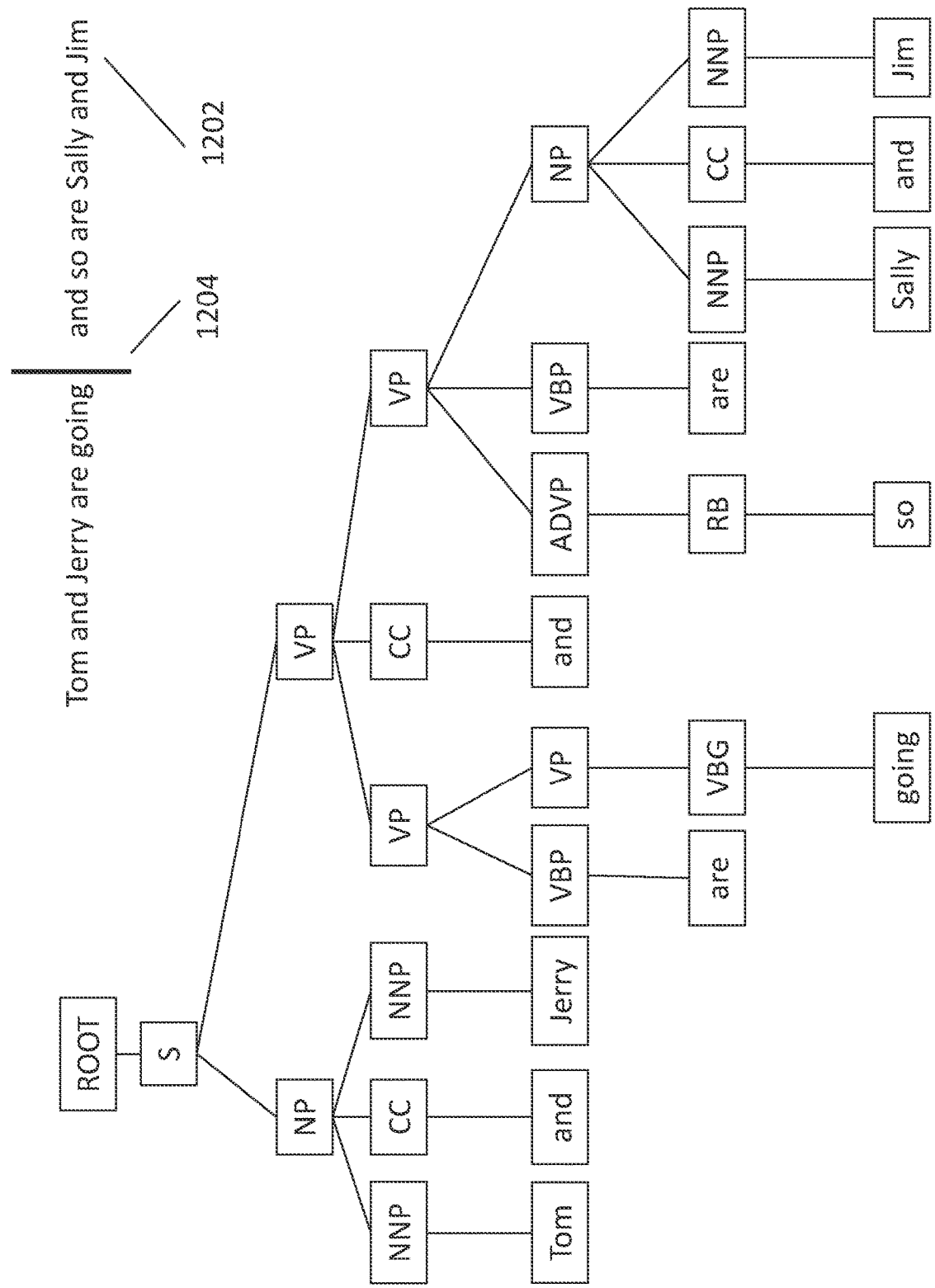
FIG. 12 illustrates exemplary results of the process shown in FIG. 1 using the system shown in FIG. 2.

FIG. 12 illustrates exemplary results of the process 100 (shown in FIG. 1) using the system 200 (shown in FIG. 2). In FIG. 12, the statement 1202 "Tom and Jerry are going and so are sally and Jim" is analyzed.

The first step is to look for coordinating conjunction (CC), of which there are three. Each side of the CCs are checked for nouns. The first and the third instances are surrounded by names, so there is only one split at the second CC. Next, the statement is parsed based upon a preposition or subordinating conjunction (IN), which there are none. Then the statement 1202 is analyzed for wh-adverbs (WRB), and there is one, 'so.' Finally, the statement 1202 is parsed based upon the use of the word 'to' (TO); of which there are none. In statement 1202, there are two splits. However, the two of them are right next to each other, so those two are combined into one. Since there is only one split, the final split 1204 is placed at the word 'and.'

Exemplary Processed Text

Figure 13:
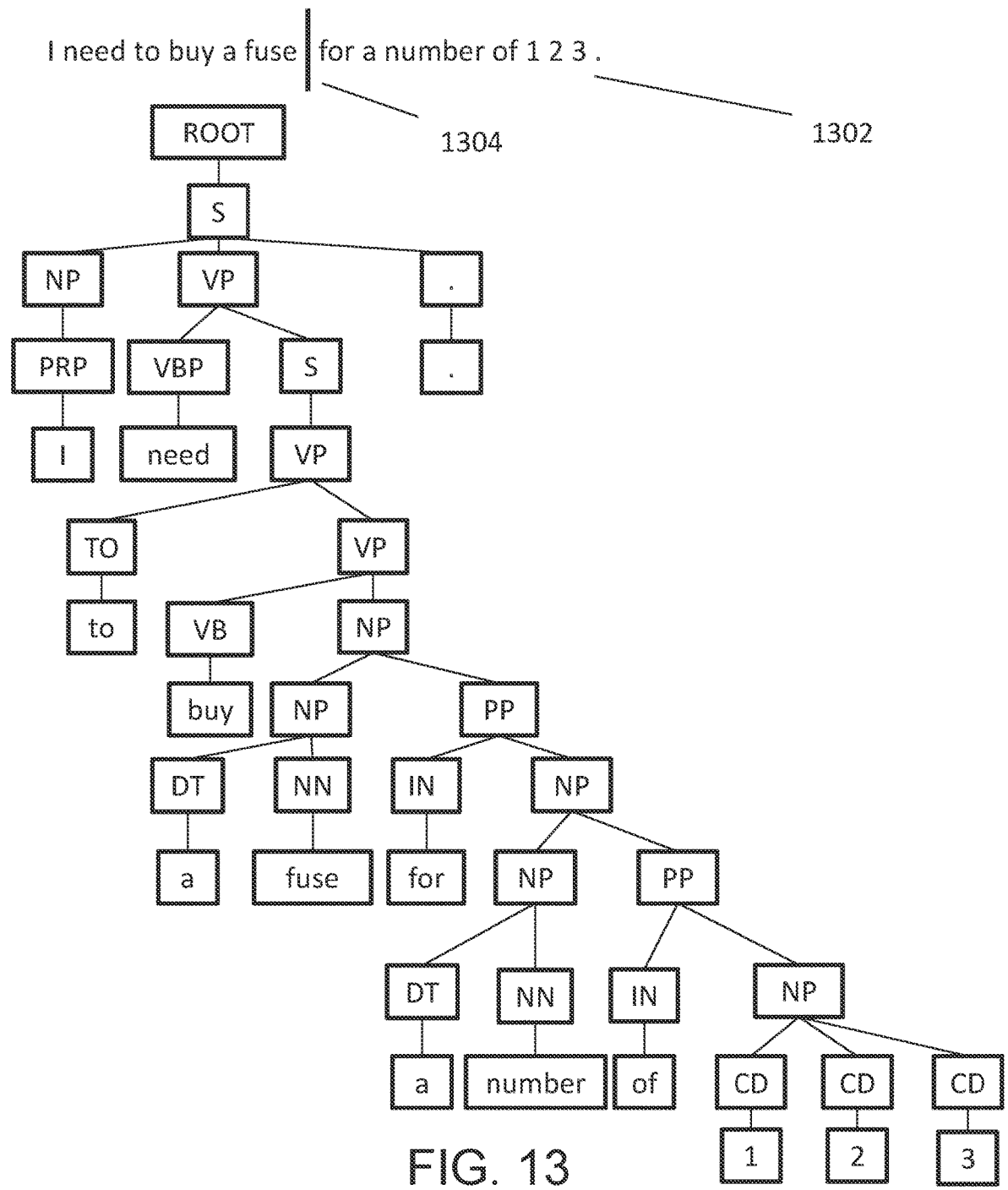
FIG. 13 illustrates exemplary results of the process shown in FIG. 1 using the system shown in FIG. 2.

FIG. 13 illustrates exemplary results of the process 100 (shown in FIG. 1) using the system 200 (shown in FIG. 2). In FIG. 13, the statement 1302 "I need to buy a fuse for a number of 1 2 3" is analyzed.

The first step is to look for coordinating conjunction (CC), of which there are none. Next, the statement is parsed based upon a preposition or subordinating conjunction (IN), which there is two, the words 'for' and 'of.' However, the number of leaves must be at least five between the words for the split to occur. Since the word 'of' is only three words after the word 'with,' no split occurs at the word 'of." Then the statement 1302 is analyzed for wh-adverbs (WRB), and there are none. Finally, the statement is parsed based upon the use of the word 'to' (TO); however, since there is only one 'to', this does not generate a split. In statement 1302, there is only one split, which is at the word for. Accordingly, the final split 1304 is placed before that word.

Exemplary Processed Text

Figure 14:
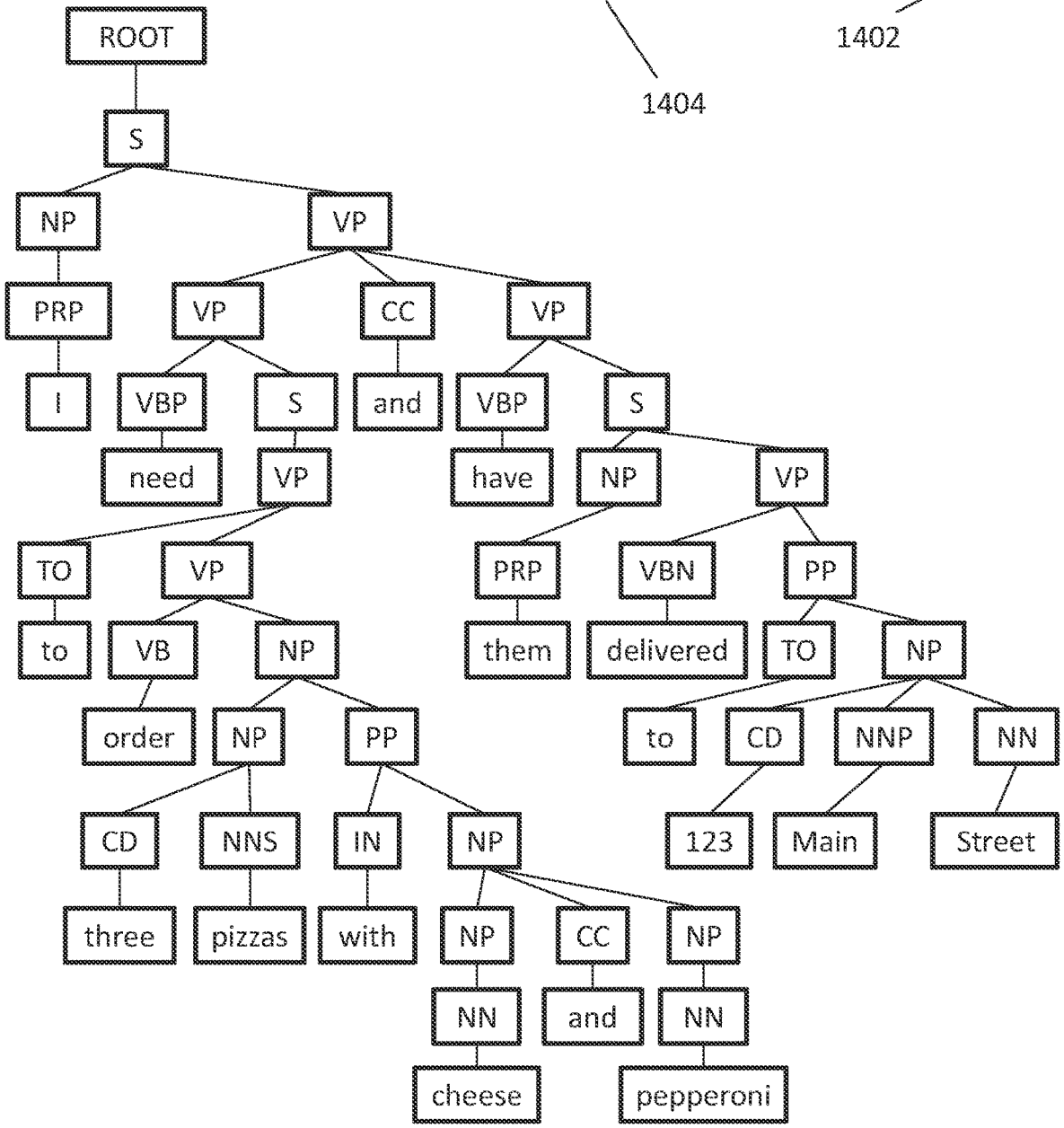
FIG. 14 illustrates exemplary results of the process shown in FIG. 1 using the system shown in FIG. 2.

FIG. 14 illustrates exemplary results of the process 100 (shown in FIG. 1) using the system 200 (shown in FIG. 2). In FIG. 14, the statement 1402 "I need to order three pizzas with cheese and peperoni and have them delivered to 123 Main Street" is analyzed.

The first step is to look for coordinating conjunction (CC), of which there are two. Each side of the CCs are checked for nouns. The first instance is surrounded by nouns, so there is only one split at the second CC. Next, the statement is parsed based upon a preposition or subordinating conjunction (IN), which there are none. Then the statement 1402 is analyzed for wh-adverbs (WRB), and there are none. Finally, the statement 1402 is parsed based upon the use of the word 'to' (TO) and there are two TOs. In statement 1402, there is one split. The second TO is not split because both of the two TOs are in sentence fragments of the same parent sentence fragment. Therefore, both of the two TOs are considered to be close together, and there is accordingly one split. Since there is only one split, the final split 1404 is placed at the word 'and.'

Exemplary Processed Text

Figure 15:
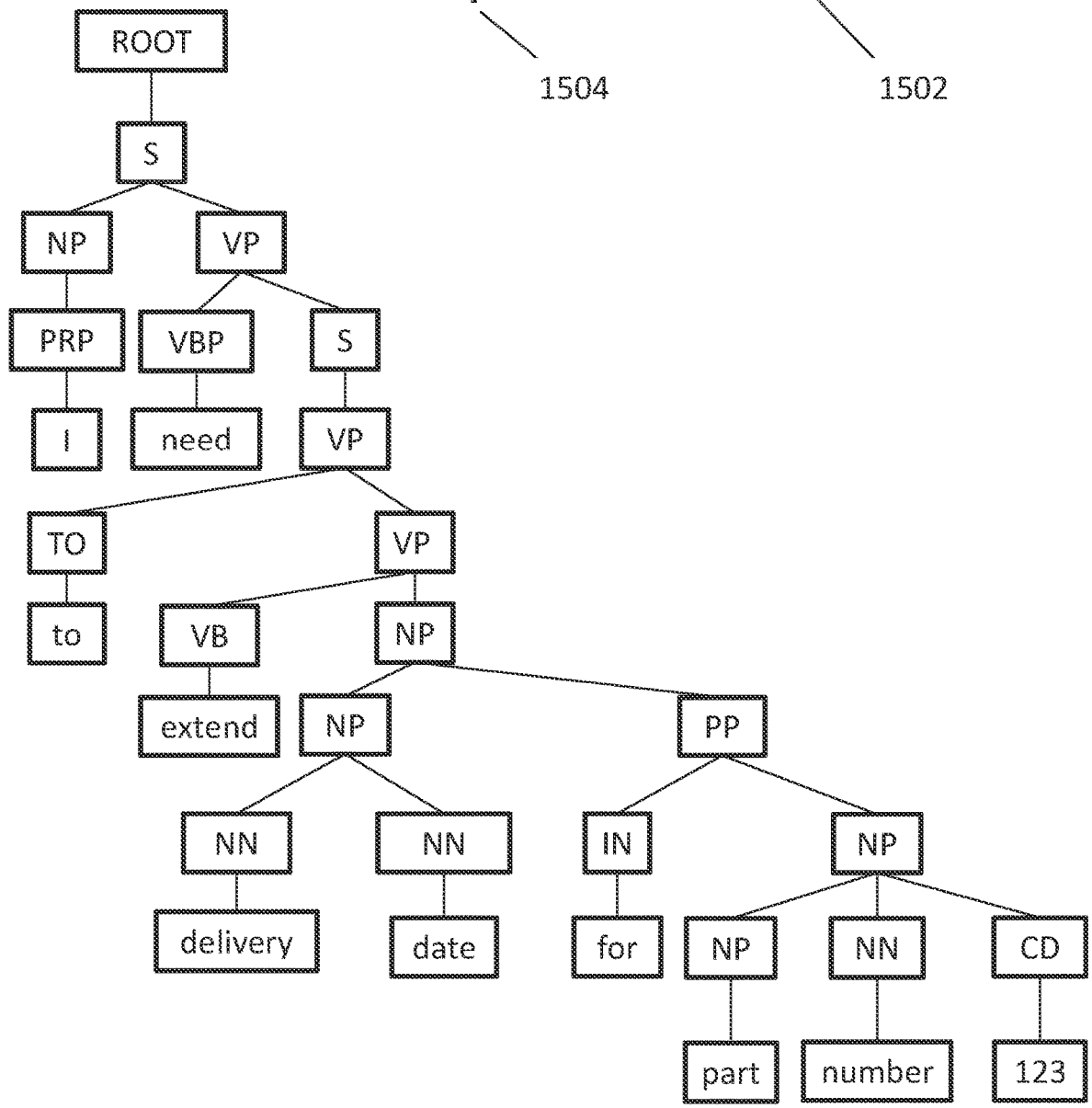
FIG. 15 illustrates exemplary results of the process shown in FIG. 1 using the system shown in FIG. 2.

FIG. 15 illustrates exemplary results of the process 100 (shown in FIG. 1) using the system 200 (shown in FIG. 2). In FIG. 15, the statement 1502 "I want to extend delivery date for part number 123" is analyzed.

The first step is to look for coordinating conjunction (CC), of which there are none. Next, the statement is parsed based upon a preposition or subordinating conjunction (IN), which there is one, the word 'for.' Then the statement 1502 is analyzed for wh-adverbs (WRB), and there are none. Finally, the statement 1502 is parsed based upon the use of the word 'to' (TO); however, since there is only one 'to', this does not generate a split. In statement 1502, there is only one split, which is at the word for. Accordingly, the final split 1504 is placed before that word.

Exemplary Processed Text

Figure 16:
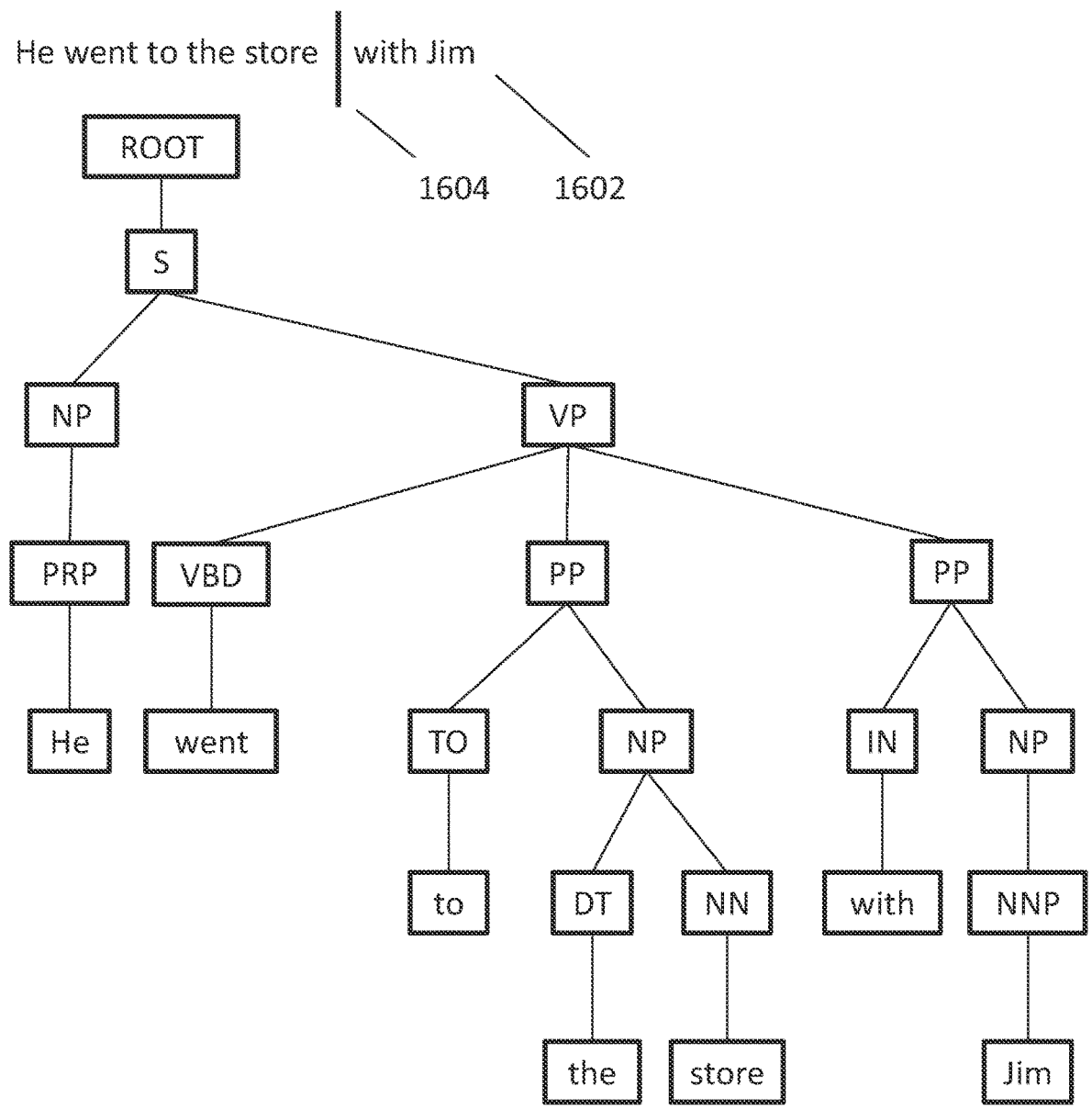
FIG. 16 illustrates exemplary results of the process shown in FIG. 1 using the system shown in FIG. 2.

FIG. 16 illustrates exemplary results of the process 100 (shown in FIG. 1) using the system 200 (shown in FIG. 2). In FIG. 16, the statement 1602 "He went to the store with Jim" is analyzed.

The first step is to look for coordinating conjunction (CC), of which there are none. Next, the statement is parsed based upon a preposition or subordinating conjunction (IN), which there is one, the word 'with.' Then the statement 1602 is analyzed for wh-adverbs (WRB), and there are none. Finally, the statement 1602 is parsed based upon the use of the word 'to' (TO); however, since there is only one 'to', this does not generate a split. In statement 1602, there is only one split, which is at the word for. Accordingly, the final split 1604 is placed before that word.

Exemplary Embodiments & Functionality

In one aspect, a computer system for parsing separate intents in natural language speech may be provided. The computer system may include at least one processor in communication with at least one memory device. The computer system may be in communication with a user computer device associated with a user. The at least one processor may be configured or programmed to: (1) receive, from the user computer device, a verbal statement of the user including a plurality of words; (2) translate the verbal statement into text; (3) label each of the plurality of words in the verbal statement; (4) detect one or more potential splits in the verbal statement; (5) divide the verbal statement into a plurality of intents based upon the one or more potential splits; and/or (6) generate a response based upon the plurality of intents. The computer system may include additional, less, or alternate functionality, including that discussed elsewhere herein.

For instance, a further enhancement may be to determine additional data needed from the user based upon the plurality of intents. This may be done by determining a request to the user to request the additional data. The request may then be translated into speech. The request may be transmitted to the user computer device.

The computer system may achieve the above results if the verbal statement is received via at least one of a phone call, a chat program, and a video chat.

The computer system may achieve the above results by detecting the one or more potential splits based upon a word structure of the verbal statement. The computer system may also detect a plurality of potential splits based on one or more labels associated with the plurality of words in the verbal statement. In addition, the computer system may reduce the plurality of potential splits based upon distance between each of the plurality of potential splits.

Machine Learning & Other Matters

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, a reinforced or reinforcement learning module or program, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample (e.g., training) data sets or certain data into the programs, such as conversation data of spoken conversations to be analyzed, mobile device data, and/or additional speech data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or other types of machine learning, such as deep learning, reinforced learning, or combined learning.

Supervised and unsupervised machine learning techniques may be used. In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. The unsupervised machine learning techniques may include clustering techniques, cluster analysis, anomaly detection techniques, multivariate data analysis, probability techniques, unsupervised quantum learning techniques, associate mining or associate rule mining techniques, and/or the use of neural networks. In some embodiments, semi-supervised learning techniques may be employed. In one embodiment, machine learning techniques may be used to extract data about the conversation, statement, utterance, spoken word, typed word, geolocation data, and/or other data.

In the exemplary embodiment, a processing element may be trained by providing it with a large sample of conversation data with known characteristics or features. Such information may include, for example, information associated with a plurality of different speaking styles and accents.

Based upon these analyses, the processing element may learn how to identify characteristics and patterns that may then be applied to analyzing conversation data. For example, the processing element may learn, with the user's permission or affirmative consent, to identify the most commonly used phrases and/or statement structures used by different individuals from different geolocations. The processing element may also learn how to identify attributes of different accents or sentence structures that make a user more or less likely to properly respond to inquiries. This information may be used to determine which how to prompt the user to answer questions and provide data.

Technical Advantages

The aspects described herein may be implemented as part of one or more computer components such as a client device and/or one or more back-end components, such as a speech analysis engine, for example. Furthermore, the aspects described herein may be implemented as part of a computer network architecture and/or a cognitive computing architecture that facilitates communications between various other devices, components, and/or users. Thus, the aspects described herein address and solve issues of a technical nature that are necessarily rooted in computer technology.

For instance, aspects include analyzing human speech to parse data from the speech. In doing so, the aspects overcome issues associated with the inconvenience of requiring speakers using automated phone systems from having to use stilted or awkward language and instead use more natural language queries or statements. Furthermore, these aspects reduce likelihood of the user/speaker being misunderstood. Without the improvements suggested herein, additional processing and memory usage would be required to perform such coordination. Additional technical advantages include, but are not limited to: i) improved speed and accuracy in processing human speech; ii) reducing misunderstandings that would require the speaker to repeat their statement; iii) improving the ability of computer systems to understand longer statements and queries; iv) allowing for multi-part queries; v) more quickly determining data that is needed to process the query; and vi) providing a more natural conversation to the speaker. Additional technical advantages are described in other sections of the specification.

Furthermore, the embodiments described herein improve upon existing technologies, and improve the functionality of computers, by more accurately predicting or identifying the statements that the speaker made. The present embodiments improve the speed, efficiency, and accuracy in which such calculations and processor analysis may be performed. Due to these improvements, the aspects address computer-related issues regarding efficiency over conventional techniques. Thus, the aspects also address computer related issues that are related to efficiency metrics and ease of use, for example.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In one exemplary embodiment, the system is executed on a single computer system, without requiring a connection to a sever computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A computer system for parsing separate intents in natural language speech, the computer system including at least one processor in communication with at least one memory device, the at least one processor is programmed to:
    receive a verbal statement of a user including a plurality of words, wherein the verbal statement is a compound statement including a plurality of intents;
    generate a constituency tree structure based upon the verbal statement, the constituency tree structure including a plurality of nodes representing words of the verbal statement;
    detect one or more potential splits in the verbal statement by parsing the constituency tree structure based upon at least one of a plurality of grammar-related rules;
    divide the verbal statement into a plurality of utterances based upon the one or more potential splits, wherein each of the plurality of utterances comprises a phrase;
    analyze each of the plurality of utterances to identify the plurality of intents of the compound statement, wherein each of the plurality of intents comprises a single idea;
    determine an order in which to process each the plurality of intents based upon stored business logic and prerequisites; and
    process each of the plurality of intents in the determined order.

2. The computer system in accordance with claim 1, wherein the at least one processor is further programmed to:
    detect one or more potential splits in the verbal statement by parsing the verbal statement based upon at least one of a plurality of grammar-related rules, wherein the plurality of grammar-related rules includes a coordinating conjunction rule, a preposition or subordinating conjunction rule, a wh-adverb rule, and a word 'to' rule.

3. The computer system in accordance with claim 1, wherein the at least one processor is further programmed to:
    generate a response to the verbal statement of the user based upon the plurality of intents;
    translate the response into speech; and
    transmit the response in speech to the user via an audio stream.

4. The computer system in accordance with claim 1, wherein the at least one processor is further programmed to:
    determine additional data needed from the user based upon the plurality of intents;
    generate a request for the additional data;
    translate the request into speech; and
    transmit the request in speech to a user computer device.

5. The computer system in accordance with claim 1, wherein the verbal statement is received via at least one of a phone call, a chat program, and a video chat.

6. The computer system in accordance with claim 1, wherein the at least one processor is further programmed to detect the one or more potential splits based upon a word structure of the verbal statement.

7. The computer system in accordance with claim 1, wherein the at least one processor is further programmed to:
    label each of the plurality of words in the verbal statement using one or more labels; and
    detect a plurality of potential splits based on the one or more labels associated with the plurality of words in the verbal statement.

8. The computer system in accordance with claim 7, wherein the at least one processor is further programmed to reduce the plurality of potential splits based upon a distance between each of the plurality of potential splits within the verbal statement.

9. A computer-implemented method for parsing separate intents in natural language speech, the method implemented by a computer device including at least one processor in communication with at least one memory device, the method comprising:
    receiving a verbal statement of a user including a plurality of words, wherein the verbal statement is a compound statement including a plurality of intents;
    generating a constituency tree structure based upon the verbal statement, the constituency tree structure including a plurality of nodes representing words of the verbal statement;
    detecting one or more potential splits in the verbal statement by parsing the verbal statement based upon at least one of a plurality of grammar-related rules;
    dividing the verbal statement into a plurality of utterances based upon the one or more potential splits, wherein each of the plurality of utterances comprises a phrase;

analyze each of the plurality of utterances to identify the plurality of intents of the compound statement, wherein each of the plurality of intents comprises a single idea;

determining an order in which to process each the plurality of intents based upon stored business logic and pre-requisites; and processing each of the plurality of intents in the determined order.

10. The computer-implemented method in accordance with claim 9 wherein the plurality of grammar-related rules includes a coordinating conjunction rule, a preposition or subordinating conjunction rule, a wh-adverb rule, and a word 'to' rule.

11. The computer-implemented method in accordance with claim 9 further comprising:

generating a response to the verbal statement of the user based upon the plurality of intents;

translating the response into speech; and transmitting the response in speech to the user via an audio stream.

12. The computer-implemented method in accordance with claim 9 further comprising:

determining additional data needed from the user based upon the plurality of intents;

generating a request for the additional data;

translating the request into speech; and transmitting the request in speech to a user computer device.

13. The computer-implemented method in accordance with claim 9, wherein the verbal statement is received via at least one of a phone call, a chat program, and a video chat.

14. The computer-implemented method in accordance with claim 9 further comprising detecting the one or more potential splits based upon a word structure of the verbal statement.

15. The computer-implemented method in accordance with claim 9 further comprising:

labeling each of the plurality of words in the verbal statement using one or more labels; and detecting a plurality of potential splits based on the one or more labels associated with the plurality of words in the verbal statement.

16. The computer-implemented method in accordance with claim 15, further comprising reducing the plurality of potential splits based upon a distance between each of the plurality of potential splits within the verbal statement.

17. A non-transitory computer readable medium having computer-executable instructions embodied thereon for parsing separate intents in natural language speech, wherein when executed by at least one processor, the computer-executable instructions cause the at least one processor to:

receive a verbal statement of a user including a plurality of words, wherein the verbal statement is a compound statement including a plurality of intents;

generate a constituency tree structure based upon the verbal statement, the constituency tree structure including a plurality of nodes representing words of the verbal statement;

detect one or more potential splits in the verbal statement by parsing the verbal statement based upon at least one of a plurality of grammar-related rules;

divide the verbal statement into a plurality of utterances based upon the one or more potential splits, wherein each of the plurality of utterances comprises a phrase;

analyze each of the plurality of utterances to identify the plurality of intents of the compound statement, wherein each of the plurality of intents comprises a single idea;

determine an order in which to process each the plurality of intents based upon stored business logic and pre-requisites; and process each of the plurality of intents in the determined order.

18. The computer readable medium in accordance with claim 17, wherein the computer-executable instructions further cause the at least one processor to:

detect one or more potential splits in the verbal statement by parsing the verbal statement based upon at least one of a plurality of grammar-related rules, wherein the plurality of grammar-related rules includes a coordinating conjunction rule, a preposition or subordinating conjunction rule, a wh-adverb rule, and a word 'to' rule; and generate a response to the verbal statement of the user based upon the plurality of intents.

19. The computer readable medium in accordance with claim 17, wherein the computer-executable instructions further cause the at least one processor to:

determine additional data needed from the user based upon the plurality of intents;

generate a request for the additional data;

translate the request into speech; and transmit the request in speech to a user computer device.

20. The computer readable medium in accordance with claim 17, wherein the computer-executable instructions further cause the at least one processor to:

receive the verbal statement via at least one of a phone call, a chat program, and a video chat; and detect the one or more potential splits based upon a word structure of the verbal statement.

* * * * *